United States Patent
Taplin, Jr.

(10) Patent No.: US 10,718,511 B2
(45) Date of Patent: ***Jul. 21, 2020

(54) SYSTEM FOR COMBUSTION OF FUEL TO PROVIDE HIGH EFFICIENCY, LOW POLLUTION ENERGY

(71) Applicant: Harry R. Taplin, Jr., Thousand Oaks, CA (US)

(72) Inventor: Harry R. Taplin, Jr., Thousand Oaks, CA (US)

(*) Notice: Subject to any disclaimer, the term of this patent is extended or adjusted under 35 U.S.C. 154(b) by 112 days.

This patent is subject to a terminal disclaimer.

(21) Appl. No.: 16/137,402

(22) Filed: Sep. 20, 2018

(65) Prior Publication Data

US 2019/0024884 A1 Jan. 24, 2019

Related U.S. Application Data

(60) Continuation-in-part of application No. 15/633,664, filed on Jun. 26, 2017, now Pat. No. 10,082,288.
(Continued)

(51) Int. Cl.
*F23C 13/00* (2006.01)
*F23N 5/00* (2006.01)
(Continued)

(52) U.S. Cl.
CPC ............. *F23C 13/00* (2013.01); *F23C 13/08* (2013.01); *F23N 1/082* (2013.01); *F23N 5/003* (2013.01); *F23N 5/022* (2013.01); *F23J 2215/50* (2013.01); *F23J 2219/10* (2013.01); *F23N 2237/12* (2020.01); *Y02E 20/328* (2013.01)

(58) Field of Classification Search
USPC ....................................................... 122/460
See application file for complete search history.

(56) References Cited

U.S. PATENT DOCUMENTS 2,013,727 A 9/1935 Douglass
3,005,699 A 10/1961 Erck et al.
(Continued)

FOREIGN PATENT DOCUMENTS

EP 0216635 4/1987
WO WO/95/05665 2/1995
(Continued)

OTHER PUBLICATIONS

International Search Report and Written Opinion of international Application No. PCT/US2011/001173 dated May 23, 2013.
(Continued)

*Primary Examiner* — Grant Moubry
*Assistant Examiner* — Rabeeul I Zuberi
(74) *Attorney, Agent, or Firm* — M.J. Ram & Associates; Michael J. Ram

(57) ABSTRACT

An afterburner system and method for reducing the $CO_2$ and other pollutants produced by the combustion of a fuel in a combustion chamber while maintaining or increasing the efficiency of said combustion includes feeding a catalyst, preferably lithium and/or boron to the afterburner, or a preconditioning afterburner, along with the exhaust from the combustion chamber. The presence of the catalyst in the after burner results in further reduction of pollutants generated by the combustion in the combustion chamber.

3 Claims, 13 Drawing Sheets

Related U.S. Application Data which is a division of application No. 13/175,761, filed on Jul. 1, 2011, now Pat. No. 9,702,546, which is a division of application No. 12/914,921, filed on Oct. 28, 2010, now Pat. No. 8,852,300.

(60) Provisional application No. 61/361,323, filed on Jul. 2, 2010.

(51) Int. Cl.
*F23N 1/08* (2006.01)
*F23N 5/02* (2006.01)
*F23C 13/08* (2006.01)

(56) References Cited

U.S. PATENT DOCUMENTS

| | | |
|---|---|---|
| 3,746,498 A | 7/1973 | Stengel |
| 3,819,334 A | 6/1974 | Yoshida et al. |
| 3,951,613 A | 4/1976 | Kiele |
| 4,002,558 A | 1/1977 | Feldman |
| 4,125,357 A | 11/1978 | Kristen et al. |
| 4,179,921 A | 12/1979 | Cook et al. |
| 4,290,402 A | 9/1981 | Bergmann |
| 4,315,430 A | 2/1982 | Szonntagh |
| 4,438,756 A | 3/1984 | Chamberlain et al. |
| 4,457,693 A | 7/1984 | McKay |
| 4,612,880 A | 9/1986 | Brass et al. |
| 4,668,247 A | 5/1987 | Berenyi |
| 4,735,705 A | 4/1988 | Burk et al. |
| 4,824,360 A | 4/1989 | Janka et al. |
| 4,927,349 A | 5/1990 | Schirmer et al. |
| 5,376,154 A | 12/1994 | Daly et al. |
| 5,388,985 A | 2/1995 | Musil et al. |
| 6,776,606 B2 | 8/2004 | Haskew |
| 6,821,932 B2 | 11/2004 | Guinther et al. |
| 6,858,047 B1 | 2/2005 | Norman |
| 6,948,926 B2 | 9/2005 | Valentine et al. |
| 7,016,779 B2 | 3/2006 | Bowyer |
| 7,152,409 B2 | 12/2006 | Yee et al. |
| 7,157,069 B2 | 1/2007 | Jurng et al. |
| 7,276,094 B2 | 10/2007 | Factor et al. |
| 7,435,080 B2 | 10/2008 | Joklik et al. |
| 7,695,536 B2 | 4/2010 | Ikeo et al. |
| 7,803,201 B2 | 9/2010 | Zhou et al. |
| 2004/0022701 A1 | 2/2004 | Segal et al. |
| 2005/0048427 A1 | 3/2005 | Brown |
| 2007/0256355 A1 | 11/2007 | Cevalios et al. |
| 2009/0053660 A1 | 2/2009 | Mikus et al. |
| 2010/0275825 A1 | 11/2010 | Bool et al. |
| 2011/0083594 A1 | 4/2011 | Terushita et al. |
| 2011/0300493 A1 | 12/2011 | Mittricker et al. |
| 2012/0052002 A1 | 3/2012 | Lee et al. |
| 2013/0232955 A1 | 9/2013 | Pekrul et al. |
| 2013/0298454 A1 | 11/2013 | Bai |
| 2013/0298464 A1 | 11/2013 | Fleischer et al. |

FOREIGN PATENT DOCUMENTS

| | | |
|---|---|---|
| WO | WO99/42763 | 8/1999 |
| WO | WO03/040269 | 5/2003 |
| WO | WO2006/037952 | 4/2006 |
| WO | WO2007/112456 | 10/2007 |

OTHER PUBLICATIONS

"Analysis for Natural Gas & Similar Gaseous Mixtures by Gas Chromatograph", #2261, *Gas Processors Association*, 6526 E. 60$^{th}$ Street, Tulsa, OK USA 74145.

High Energy Particles Shatter & Ionize Fuel Chains

SYSTEM FOR COMBUSTION OF FUEL TO PROVIDE HIGH EFFICIENCY, LOW POLLUTION ENERGY

This application is a Continuation-in-Part of Ser. No. 15/633,664 filed Jun. 26, 2017, now U.S. Pat. No. 10,082,288 issued Sep. 25, 2018, which is a Divisional of U.S. application Ser. No. 13/175,761 filed Jul. 1, 2011, now U.S. Pat. No. 9,702,546, issued Jul. 11, 2017, which is a Divisional of U.S. application Ser. No. 12/914,921 filed Oct. 28, 2010 claiming benefit of U.S. Provisional Application 61/361,323 filed Jul. 2, 2010.

FIELD OF THE INVENTION

Processes utilizing catalysts to reduce carbon dioxide and other harmful emissions from fossil fuel combustion which increase heat and energy production, improve efficiencies of engines, boilers and turbines and increase oxygen in the exhaust streams from fossil fuel combustion processes are described.

While the invention described herein is applicable to all fuel burning devices including, but not limited to, burners, combustion chambers and engines, in a particular embodiment an engine with reduced carbon oxide emissions is conditioned by the presence of a catalyst, such as lithium, during the combustion process of hydrocarbon fuel containing lithium resulting in continued reduced carbon oxide emissions during the combustion process of hydrocarbon fuel when compared with the same engine operated without the catalyst addition. The process and procedures set forth herein also relate to a method of combusting a hydrocarbon fuel in a hydrocarbon powered engine having an internal surface conditioned by combusting a hydrocarbon fuel containing the catalyst (e.g., a lithium salt to provide a lithium conditioned surface), wherein the effluent gas has a lower concentration of carbon oxides than combusting the fuel under similar conditions in an engine not having a lithium conditioned surface.

The additive contemplated for use in the present invention includes, in a preferred embodiment, lithium salts, specifically lithium nitrate, in organic or aqueous solvents including isopropanol. The particular metallic salts added to engine fuels as set forth herein have been found by applicant to increase internal combustion engine efficiency and decrease vehicle gaseous emissions such as CO, $CO_2$, $C_6+$, and other compounds. These phenomena are dependent on many parameters including the fuel chemical composition and interaction as well as exposed physical environment.

In a particular embodiment, the engines contemplated for use in the present invention include the gasoline-powered internal combustion engines ignited by spark and also compression internal combustion (diesel) engines.

BACKGROUND OF THE INVENTION

There is an urgent need to reduce the emissions of carbon dioxide ($CO_2$), which is a green house gas caused by the combustion of fossil fuels and is identified as the primary cause of global warming. There is also a need to reduce many harmful pollutants identified with fossil fuel use reported to be causing serious health problems worldwide.

It is generally agreed that combustion processes are extremely complex with many reactions and processes occurring over very short time spans measured in micro seconds. Our knowledge of the gas or vapor phase of combustion also indicates that the atoms and molecules in the gas phase are undergoing over 10 billion violent collisions/second. Some of the scientific roots of this process have been found to be in the emerging field of Condensed Matter Physics which is concerned with understanding distinct states of matter, namely gas, liquid, solid, and plasma. The diversity of systems and phenomena included in this field makes condensed matter physics the largest field of contemporary physics. It is also reported that one third of all United States physicists identify themselves as condensed matter physicists. According to current literature this field has a large overlap with chemistry, materials science, and nanotechnology, and there are close connections with the related fields of atomic physics and biophysics. Theoretical condensed matter physics also shares many important concepts and techniques with theoretical particle and nuclear physics setting a clear precedent for the claims of this invention.

Catalysts are commonly used to reduce pollution levels. However, the catalysts of identified herein are not commonly used. Their high effectiveness is attributed to a very high level of particle activation produced by the process described herein.

Currently there is only one primary approach being seriously considered and funded for of preventing carbon dioxide levels from continuing to build up in the earth's atmosphere and cause the severe climate changes identified with global warming. The principal method being considered, namely carbon capture and storage (CCS), is a very expensive and a potentially dangerous process. Capturing and compressing $CO_2$ requires the use of a considerable amount of energy and would increase the fuel needs of a coal-fired plant utilizing CCS by 25%-40%. These and other system costs are estimated to increase the cost of energy from a new power plant with CCS by 21-91%. These estimates apply to purpose-built plants near a storage location. Applying the CCS technology to preexisting plants or plants far from a storage location is more expensive. A prominent government official with responsibilities to solve this problem has termed this challenge a nightmare. Carbon dioxide under high pressures used in this process are quite slippery and leaks that have occurred have been lethal to animals and humans.

Some other solutions being investigated include deep ocean storage with the risk of greatly increasing the problem of ocean acidification, dead zones, reef destruction and sea life kill-off in a manner similar to toxic and acid laden air pollution.

Although the processes involved in CCS have been demonstrated in some isolated industrial applications, no commercial scale projects which integrate these processes exist, and therefore the costs are uncertain. However, some recent credible estimates indicate that a carbon price of US$60 per US-ton is required to make capture and storage competitive, corresponding to an increase in electricity prices of about 6 cents per kWh.

A method of growing algae as a means to capture $CO_2$ is being developed. However, this procedure it is still in the experimental and development stage. Cost and capacity are a challenge and it does not seem to be scalable to a sufficient level to turn around the current trends in carbon dioxide accumulation in the atmosphere.

The process described herein brings with it a huge financial incentive for the profit lines of users because of reduced fuel consumption. With this comes less fuel throughput producing less pollution. In addition, the process also reduces pollution levels from fuels burned.

As oil dependence increases, proven reserves become depleted and sources such as strategic reserves enter into fall-back planning, the process set forth can become a strategic reserve in its own right and a viable solution to the issue of oil depletion and dependency on unfriendly and unstable suppliers to a civilization vitally dependent on energy, especially foreign oil supplies with exposure to vulnerable "choke" points in worldwide supply systems.

Coal is also being recognized as a major source of contamination and has been universally recognized as a "dirty" energy source. This process set forth herein brings the promise of clean coal and a revitalized economy for the world with rising employment statistics.

SUMMARY

Set forth herein is a method for utilizing catalysts to reduce carbon dioxide and other harmful emissions generally produced in fossil fuel combustion processes. The method is directed to a controlled process which reduces $CO_2$ and other air pollution levels and increases thermal efficiency. The method includes a process for controlling, regulating and optimizing the complex interactions in gas and plasma states of fossil fuel combustion. The methods and processes disclosed herein are unique and unobvious methods of optimizing the use of catalysis in fossil fuel combustion processes, providing for the initiating and controlling or regulating a process which results in reduced $CO_2$ and other air pollution levels and increased thermal efficiency. As a result, $CO_2$ and other harmful air pollutants are significantly reduced while thermal efficiencies are brought to new higher levels. The optimizing steps include not only positive methods but also steps to elimination moderators that work against the effectiveness of the processes. One aspect of these processes are interactions with chamber surface components such as boiler tube walls, cylinder confines, insulation materials exposed to combustion and the combustion gases. As a result of these controlled methods of operation, harmful air pollutants are significantly reduced while thermal efficiencies are brought to new higher levels.

One aspect of the process set forth herein is to provide a method for reducing $CO_2$ at its source in fossil fuel combustion processes which is simple, inexpensive and can be applied worldwide in a short period of time without need for complex and expensive mechanical operations and equipment such as scrubbers, precipitators, bag houses, particulate traps and fly ash collectors, catalytic converters and complex control systems that have emerged as solutions to combustion pollution problems since the 1970's. Furthermore, the process reduces energy expenses for all users of coal, oil and gas including electrical generation. Still further, the process is useful for combating the specter of global warming and reducing the tremendous harm being caused by air pollution to humans, the environment, to other life forms and forests while providing cheaper energy as an incentive to invest in this technology for the common good. Further, the process increases profits and lowers energy bills while reducing harmful pollution, especially $CO_2$ suspected to be a cause or global warming. Still further, while the process is reducing $CO_2$ it also produces oxygen which is a further beneficial result.

BRIEF DESCRIPTION OF THE DRAWINGS

FIG. 11 is a graph showing over 300 boiler tests with efficiencies significantly higher than the design values for various boilers they were run on.

DETAILED DESCRIPTION

Figure 1:
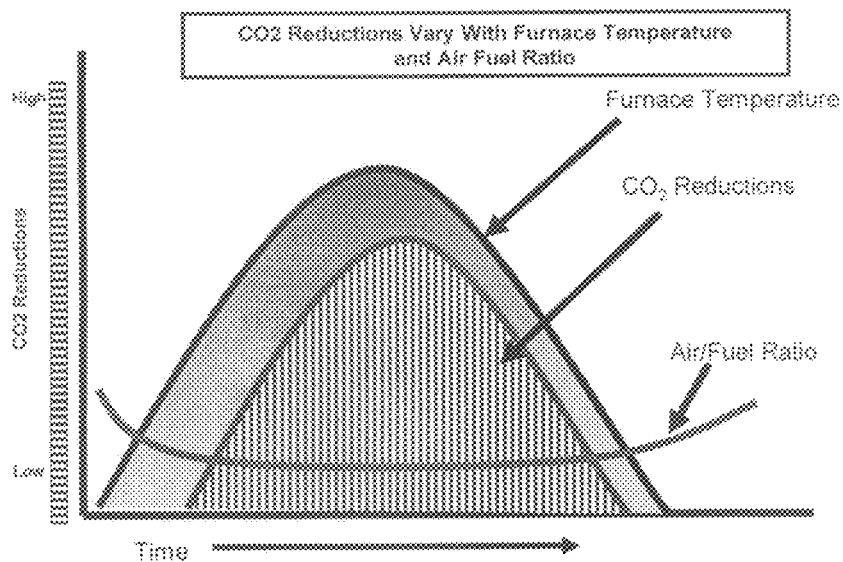
FIG. 1 shows the results of a series of tests in a furnace.

It has been found by applicant that when catalysts, such as lithium and certain other catalysts disclosed herein, are used in the combustion processes and are controlled at very precise concentrations, the beneficial improvements shown in the following figures and tables result. Operating parameters for optimal operating, optimized reductions of numerous emissions have been produced as a result of unique control of the catalytic processes. Additionally, improved efficiency, reduced fuel and oxygen consumption and other beneficial results can be brought about and maintained despite the many challenging dynamic interactions present that have prevented these discoveries in the past.

Various different combustion chambers or burners are used in the processes for combusting the many and varied fossil fuels including, but not limited to, gases such as propane, methane and natural gas, oils such as gasoline, diesel and petroleum residuals and various ranks and types of coals as well as biofuels. These fuels are used in many different combustion chambers, such as furnaces, boilers, engines and turbines. In addition, many other types of controlled reaction chambers are suitable for producing higher levels of heat and energy with the scope of the invention described herein. Certain other designs are suitable for after-treatment of pollution laden exhaust systems containing toxic and contaminated gases and affluent from chemical processing and detoxification of contaminated materials such as coal ash and radioactive wastes.

In a particular embodiment, improvements to a combustion engine comprising the use of a lithium conditioned chamber for producing reduced carbon oxide engine emissions are disclosed. Preferably, the lithium conditioned chamber is formed by combusting a hydrocarbon fuel containing a lithium salt in the chamber.

Described herein are methods of combusting a hydrocarbon fuel containing a lithium salt in a hydrocarbon powered engine to produce a lithium conditioned chamber in the engine, and combusting a lithium free hydrocarbon fuel in the conditioned chamber in order to produce a low concentration effluent gas. The low concentration effluent gas has a lower concentration of carbon oxides than an effluent gas from an engine without a conditioned chamber combusting the same lithium free hydrocarbon fuel.

Disclosed is a novel addition of lithium nitrate to gasoline or diesel powered vehicles to cause internal engine conditioning or surface alteration due to the combustion process occurring in the presence of lithium nitrate.

Also disclosed is a method of conditioning the internal combustion surface of an engine of a gasoline or diesel-powered vehicle by combusting a hydrocarbon fuel, including lithium nitrate, to obtain an engine capable of providing emissions having a lower concentration of carbon oxides than obtained by combusting the same hydrocarbon fuel under similar conditions in an engine not having lithium conditioned surface.

Also provided is a method of conditioning the internal surface of a diesel powered vehicle by combusting a hydrocarbon fuel, including lithium nitrate, to obtain an engine capable of providing lower emissions, namely lower concentrations of carbon oxides and a lower concentration of hydrocarbons than obtained by combusting a hydrocarbon fuel under similar conditions in an engine not having a lithium conditioned surface.

The present process also provides a method of conditioning the chambers of an internal combustion gasoline or diesel engine of a vehicle by combusting a hydrocarbon fuel, including lithium nitrate, to obtain an engine capable of providing an emission gas having a lower concentration of carbon oxides than obtained by combusting a hydrocarbon fuel under similar conditions in an engine not having a lithium conditioned engine chamber.

A method of combusting a hydrocarbon fuel in the presence of a lithium salt is disclosed to obtain a vehicle engine effluent having reduced carbon oxide emissions.

The method of combusting hydrocarbon fuels containing a lithium salt provides a lithium conditioned engine surface, wherein the effluent emission gas contains a lower concentration of carbon oxides and a lower concentration of $C_6+$ alkanes than combusting said fuel under similar conditions in an engine not having a lithium conditioned surface.

Depending on the desired results, different operating conditions are established using an array of instruments, sensors, transmitters, computer and software interface, algorithms for specific end objectives, transmission links and all the various components for the myriad of applications possible which have been developed for the art of plant management and control.

One aspect of the process is that it usually requires a mass of catalyst less than about one millionth of the mass of the combustion products treated.

In a preferred embodiment, a gaseous state is created and utilized in commonly available combustion chambers to produce desired catalytic reactions. Specifically, the chamber must be hot enough to evaporate and diffuse the catalyst and other constituents into a gaseous state so as to cause atoms and molecules in the combustion chamber to collide and interact at a very high rate, preferably over a billion times a second. When sufficiently initiated, the intense particle activity created produces numerous desired effects.

The combustion chamber can be any size or shape, but should be strong enough to withstand high pressures or vacuums required for specific combinations of catalysts and processes. Reaction chambers can also require high temperature insulation to maintain operating temperatures and to protect the metal surfaces from overheating. Operating temperatures of chambers must be sufficiently high to maintain contents in a vapor or plasma state. Ordinary combustion chambers such as furnaces, boilers, engine cylinders, and gas turbine combustors are some examples that serve this purpose in existing equipment. In light of the teachings herein, special chambers can be designed to serve many additional purposes. It is also contemplated that the chambers can be fabricated from materials seasoned with the catalyst before construction of the chamber. They can be opened or closed to atmosphere to generate heat and electrical power. For example, they can comprise closed or open ended piping or ductwork systems such as boiler breechings and stacks where the process can be activated and continued as other, possibly contaminated, streams pass through the same confines for treatments.

The non-combustion system has several attractive features, namely they can operate at pressures above atmospheric and with vacuums. Additionally, they work as non-emitting systems and they completely utilize all introduced catalysts. Applicant has shown that coating the inside surface of the non-combustive system with a suitable catalysts (see Table 3) and activators such as potassium and thorium work well for repeated activation cycles. However, this can also be accomplished with high voltage arcs and high temperature vaporizing units. As an alternative means to activate the chamber, a combustion process can be used to precondition the chamber, vaporizing catalysts and activators. The combustion can then be turned off with the reaction continuing as a self-sustaining process.

An objective of the control system is to maintain an activated gaseous state under optimum operating conditions. The catalysts, especially lithium, are active in the combustion zone, but also have a moderating influence when concentration is not maintained in a target range of 0.1 to 0.5 part per million (100 to 500 parts per billion) lithium. Outside of this range benefits of the catalyst may be diminished or turned off. Optimal control logic searches out and maintains the desired result which may be found at other concentrations.

Particle activity caused by select catalysts produces extremely high temperature events. These events cause the catalysts to become embedded and sometimes fused or alloyed with the chamber's base materials. In addition, catalyst particulates condense and adhere to chamber surfaces and are embedded in microscopic crevices and intergranular spaces of metals and insulation. These then serve as origin points for catalysts and the enhanced activities of this catalyzed process. This conditioning process is referred to as "seasoning." It is manifest as a long term influence which continues, often producing significantly increased heat and energy production accompanied pollution reductions, well beyond the point in time when catalyst is no longer being added to the reaction zone. Furthermore, this ongoing seasoning effect continues working after thorough cleaning of metal surfaces and replacement of insulating materials. In a particular chamber, the effect could only be turned off by replacing the combustion chamber itself, after which efficiencies returned back to the normal levels advertised by the manufacturer and measured during baseline testing programs prior to addition of the catalyst.

Radiant energy transfer, occurring in flame zones, is very efficient when compared to convection and conduction of energy. Radiant heat transfers exponentially with the absolute temperature. Measured high temperature events caused by the catalyst accounts in part for the higher efficiencies and increased power produced when certain catalysts are present.

The described process is simple because it requires no significant capital investments for immediate application in existing fossil fuel applications. The described compositions are simply added to the fuel supply at precise ratios. The catalysts are largely benign, non-poisons, non-heavy metals which are non-toxic and non-radioactive safe formulations. In addition, they can be shipped by common carriers with no restrictions. The value of fuel savings alone far outweighs its cost.

Reduction of carbon dioxide emissions is accomplished in two ways by the described process. First, carbon dioxide is transformed into benign compounds and elements. Secondly, the amount of fossil fuel consumed is reduced with new high levels of efficiency. Both of these methods of reducing $CO_2$ can occur at the same time by optimally controlling the processes as described herein.

It has been found that these desired results either will not occur or will not produce their full potential benefits unless without use of certain control strategies described herein. Described herein are various methods to selectively and continuously control combustion systems to reduce carbon dioxide and other undesirable emissions while improving efficiencies. In addition, optimization of the process parameters provides added benefits in $CO_2$ and fuel use reduction.

Initiating the processes incorporating features of the invention is accomplished by delivery of one or more of the atoms, or compounds containing such, referred to herein as catalysts, listed in Table 1. These catalysts have been found to also act to a greater or lesser extent as inhibitors or moderators at different concentration levels so their use requires a level of control governed by adequate instrumentation and specific information for predicting performance results. Certain of the catalysts can be fed into the combustion chamber while others are produced in the reaction zone by the actions of other catalysts and combustion conditions. These same catalysts can also moderate or retard the beneficial reactions if used at non-preferred concentrations. Adequate levels of the desired results are produced with appropriate control techniques described herein. It should be noted that the designation "catalyst" is selected for description of the materials used in the process even though the common definition of catalyst in the literature may not properly describe the effect actually seen. For example hydrogen and helium may not be generally considered as catalyst by those skilled in the art; however, it has been discovered that their presence in the described process under proper operating conditions can provide a beneficial result similar to generally recognize catalysts under used under similar operating conditions.

TABLE 1

| Catalysts Beneficial To The Process |
| --- |
| Hydrogen |
| Helium |
| Boron |
| Lithium |
| Beryllium |
| Magnesium |
| Potassium |
| Sodium |
| Chlorine |
| Strontium |
| Argon |

The steps followed in the processes being described herein deal with controlling and regulating a complexity of interactions in gas and plasma states of fossil fuel combustion. They have also been found to work under different conditions.

In a preferred embodiment, initiation of the reactions within the scope of the invention is accomplished by the delivery of lithium compounds, including but not limited to lithium acetate, lithium nitrate. For example, a preferred concentration of the lithium atom is 15% to 0.00000005%, preferably 5% to 0.00000005%, and most preferably 7 to 35 parts per billion lithium based on the quantity of the fuel and air supply delivered to the combustion zones. Higher concentrations have not been found to be less beneficial in some instances but some lesser benefits are still produced with higher concentrations. These same preferred ranges of concentration also apply to magnesium, beryllium, sodium, potassium and boron compounds.

The catalyst can be introduced to the hot combustion zone using various different delivery mechanisms. Suitable techniques include, but are not limited to, delivery as an additive to the fuel, injection as a hot vapor into the combustion chamber, introduction into the combustion air supply stream, use of pre-coating insulating refractory, vaporizers, fog generators and misters to inject catalyst into the combustion process stream, direct insertion into combustion zones as a solid which then evaporates to coat chamber surfaces and combinations thereof. One skilled in the art, based on the teachings herein will readily recognize that there are other procedures that can be used to accomplish delivery of the catalysts to the combustion chamber to achieve the appropriate concentration ratios of lithium, or other catalysts, atoms into the combustion vapor-plasma phase. The objective is to establish effective ratios in the vapor-plasma phase by controlling feed rates with the flame vaporization rate. This is balanced against condensation of these vapors on cooler surfaces of the hot zone and then the re-evaporation from those cooler surfaces with radiant energy from the combustion flame and other radiant sources and with energy from highly energetic collisions of a wide assortment of particles and molecules. Fossil fuels coming from deep in the earth are known to include inherent trace amounts of radionuclides as well as other materials that also influence the plasma activities. Considering the continuous evaporation and condensation in different temperature zones, the complex soup of elements involved, various radicals and trace elements present, different fuels, possible catalysts and chamber deposits there are a multitude of possible options available and approaches for optimization through monitoring conditions and various combustion adjustments and catalyst injection adjustments.

The bottom line objective is not necessarily to control the quantity of catalyst delivered to the combustor, but to control that delivery rate to obtain the desired concentrations in the combustion zone plasma. Diluents can be used to achieve desired mixing ratios, with the objective being to deliver the lithium, other alkali metals or other desired catalyst, into the hot combustion zone where it exists as a vapor. For example the lithium can be delivered as a solid, liquid, gas or plasma and in any compound. However, inorganic compounds are preferred as organic materials, such as soaps, tend to leave undesirable residues. Some diluents useful for accomplishing this for various delivery systems, especially for fuel borne delivery techniques include, but are not limited to water, water based miscible mixtures, a solution miscible in water, emulsions, hydrocarbons such as aliphatic, cycloaliphatic, paraffinic, olefinic, aromatic, synthetic oils, ethanol, isopropyl alcohol, methanol, monohydric alcohols, polyhydric alcohol, aliphatic alcohols, alicyclic alcohols, 2 ethyl hexyl nitrate (2EHN) and Di pert 3vtal peroxide to name a few.

Alkali metals in the form of paraffin blocks as well as soaps and organometallics are effective. The objective is to produce lithium ions in a vapor or plasma. Further, formation of the ion in the combustion plasma is not necessary as the ionization of the catalyst can be generated in ambient air at room temperature and then delivered to the combustion plasma. One preferred method of precision control of injection rates, for example for vehicle and diesel applications, is the use of programmable delivery cartridges similar to those used for ink-jet applications because they can be precisely controlled by programming as part of a computerized system designed with the capability to measure and optimize system performance at extremely low delivery rates.

Mixing ratios, based on the delivery of a quantity of lithium or elemental alkalis in the compound, being used are set forth below in Table 2. The mix is in parts per billion based on the weight of fuel being burned

TABLE 2

| Parts per Billion Lithium in the Fuel | |
| --- | --- |
| Broad range | 4,000 to 15 |
| Preferably | 1,000 to 50 |
| Most preferably | 500 to 100 |

The mixing ratios are based on the presumption that that there is no water in distillate fuels, such as gasoline and diesel, being used. Alcohols such as ethanol and isopropanol as well as glycolic acid can be used. Certain fuels like residual oil and coal can be treated with water based solutions because so little is used. With natural gas, a water mix using these ratios can be vaporized in the combustion air being carried to the combustion zone. With various different types of coal, various water based drips and mists can be used. When seasoning occurs less and less catalyst is required. For example, when the operating chambers become "seasoned" and system optimization is approached; less catalyst can be delivered. Adjusting to this with gradually declining injection ratios is one of the control method described herein. If the quantities of catalyst delivered and the residual levels are not properly controlled the reactions can be turned off as a result of too much catalyst being present. Adjusting delivery with gradually declining ratios is a control method described herein.

Uniform mixing and interaction of active species in the plasma and vapor zones is accomplished by insuring the adequacy of the turbulence of fuel and air mixing in the precombustion zone and as combustion occurs in the gas phase and plasma phase. The activity in the gas phase and ion phase is on the order of billions of collisions a second. Activated plasmas are created with an abundance of free radicals and ion activities and when properly controlled cause the unique and useful products of this invention.

As set forth herein, lithium has been found to be effective for reducing $CO_2$ while overcoming a major concern about oxidation characteristics. Lithium nitrate, one of the prime candidates for reducing $CO_2$ absorbs moisture readily. This property can be used to great advantage in overcoming the oxidizing effects of its dry powder form. For example, it can be mixed with isopropyl alcohol and applied to coal. The alcohol then evaporates leaving behind a coating of lithium nitrate on the surface of the coal which then absorbs moisture and disappears into the coal, making it indistinguishable from other untreated coal. Alternately it can be treated by simply sprinkling some lithium nitrate on the coal and letting its natural property of absorbing moisture complete the coating process. Alternatively, a water solution can be sprinkled or spraying to produce a pre-coated coal. Various carriers can be envisioned knowing this simple characteristic, lithium nitrate and moisture absorbed by it will adhere to the surface of the coal, and become combined with the "fixed" moisture in the coal. This is a simple means to overcome the oxidizer characteristics of dry lithium nitrate as well as a safe way to meter the catalyst.

Activated plasmas involve an abundance of free radicals, monatomic collisions and other ion activity. When properly controlled and mixed, the unique and useful products of this invention are produced. Interaction of active species in the plasma and vapor zones is accomplished by insure adequate turbulence of fuel and air mixing and vaporization of the catalysts. The activity in the gas phase and plasma phase is on the order of billions of collisions a second which is one of the primary keys to these processes.

Typically combustion chambers are surrounded by various types of high temperature insulating materials to deal with high temperature and radiation from the flame and hot combustion gases. The cooler furnace walls of boilers are designed to facilitate the transfer heat to working fluids such as water and steam. In engines the cooler cylinder walls and other metal parts are designed to contain high pressure spikes produced by hot combustion. These cooler boundaries chill the hot combustion gases forming boundary layers of catalysts with temperatures go from extremely hot to relatively cool, and the combustion mixture varies from an ion plasma to vapor to liquid to solid for the catalyst in micro seconds and at very short distances, each phase contributing to the dispersion and concentration of the lithium and other catalyst ions in the plasma phase in some way.

The lithium boiling point is 2,448° F. (1,342° C.), melting point is 356.97° F. (180.54° C.) and it provides varying levels of vapor pressures at temperatures found in each phase, even in the solid state. Most commonly, the adiabatic combustion temperatures of fuels are around 3,992° F. (2,200° C.) for coal, around 3,902° F. (2,150° C.) for oil and around 3,632° F. (2,000° C.) for natural gas. These flame temperatures correspond to usual ambient inlet air and fuel temperatures for $\lambda=1.0$, which is the symbol representing the stoichiometric combustion ratio.

In the combustion and other environments described herein the lithium catalyst is transformed into all of the four classic phases of matter; the gas phase through high temperatures and vaporization, the solid phase when condensed on cooler surfaces, in a liquid phase due to liquefaction during cooling and heating processes and in a plasma state at higher combustion temperatures. These various states of matter will occur depending on the pressure and temperature maintained at any particular point in the process. Each phase plays an important part in the establishing the preferred concentration where the process takes place and where each atom, ion and molecule experience over 10 billion collisions a second. Combustion is a radical chain reaction where many distinct radical intermediates participate. There are a great variety of fuel radicals and oxidizing radicals in the process. Such intermediates are short-lived and many have not been isolated. Another important control is that, unlike gases, plasmas self-generate magnetic fields and electric currents, and respond strongly and collectively to electromagnetic forces. The presence of these fields and forces alter the interactions of nuclear forces and coulomb forces which in turn create additional interactions.

Table 3 lists typical flame temperatures that can be expected with standard burners in typical installations. The temperature determines the diffusion capability and rate of catalysts into the gaseous or plasma zones of combustion processes and is one of the key factors in the controlling the processes described herein.

TABLE 3

Excess Air Flame Temperature Relationship

| | Temperature Degrees F. | | | |
|---|---|---|---|---|
| Excess Air % | Natural Gas | Propane | Oil #2 | Oil #6 |
| 0% | 3,400 | 3,700 | 3,800 | 4,000 |
| 25% | 2,900 | 3,100 | 3,200 | 3,400 |
| 50% | 2,500 | 2,600 | 2,800 | 2,900 |
| 75% | 2,300 | 2,300 | 2,400 | 2,600 |
| 100% | 2,000 | 2,000 | 2,200 | 2,300 |

A second important factor is the equation for radiant heat transfer:

$$Q = \rho\, S\, T^4$$

where Q is Btu/hr $\rho$ is the Stefan-Boltzman constant: $1.17 \times 10^{-9}$ BTU/sq-ft-hr S is the surface area, sq ft T is absolute temperature F+460

It can be seen from this equation that the higher the temperature of the flame, the more exponentially intense the radiant heat transfer is, which in turn influences the evaporation rate of condensed catalyst in the reaction zone. Flame temperatures shown in Table 3 and heat absorption by chamber components can significantly alter the concentration of the catalyst in the combustion plasma.

Collision activity plays a significant role in the combustion process. When reactant particles collide, only a certain fraction of the total collisions have the energy and impact angles to connect effectively and cause the reactants to transform into new products. This is because only a small portion of the molecules or atoms have enough energy and the right angular orientation at the moment of impact to break existing bonds and form new ones. However, with particle activity in terms of billions per second and the absolutely huge populations involved, even low statistical probabilities become possible. The minimal amount of energy needed for this to occur is known as the activation energy. If the collision is successful, the elements react with each other. However, if the concentration of at least one of the elements is too low, there will be fewer particles for the other elements to react with and the reaction will happen much more slowly. As temperature increases, the average kinetic energy and speed of the molecules increases but this only slightly increases the number of collisions. The rate of the reaction increases with temperature increase because a higher fraction of the collisions overcome the activation energy. If moderating and higher mass species are present they will absorb the aggregate collision energy available reducing the number of successful collisions. Therefore, a continuous analysis of the combustion products formed by the process is desirable for determining and imposing effective process control. Lithium is a preferred catalysts because it has unusually low binding energy compared to the next lighter and heavier elements, helium and beryllium. This means that lithium alone among the light elements can produce net energy through fission events. This provides a good probability of kicking off additional reactions and additional chain formation, producing the results measured in the experiments described in the included figures and tables. It was found by measuring particle activity that alpha particles and protons were being created by this process using special instruments designed for such measurements. Their voltages and reaction temperatures are listed in Table 4. Also listed are experimental results measured in combustion phase experiments simulating the combustion experiments described herein. This is not to say that the results are not catalytic, it may that this data is in fact an explanation of the catalytic processes.

TABLE 4

| | | Degrees F. |
|---|---|---|
| Alphas | 8.6 MeV | 1.55E+07 |
| Hydrogens | 5.4 MeV | 5.40E+06 |

| | | Degrees F. |
|---|---|---|
| 8 | KeV | 14,000 |
| 304 | KeV | 550,000 |
| 800 | KeV | 1.4 Million |
| 1,600 | KeV | 2.9 Million |
| 3,200 | KeV | 5.8 Million |
| 4,000 | KeV | 7.2 Million |
| 4,088 | KeV | 7.4 Million |

The particles activated in the plasma have sufficient energy to cut and separate the long hydrocarbon chains of fossil fuels into smaller cleaner burning chains. Instant break up of these chains and ionization produces a better more efficient burn. Accordingly, the activated plasma zone can be used to rapidly break the hydrocarbon chains and molecules into smaller chains and molecules so that they can be more efficiently combusted. In coal combustion for example this leads to intensive devolatization producing CO, $CO_2$, $H_2$, $N_2$, $CH_2$, $C_6H_6$ and others, accelerating the oxidation of volatile fuel combustibles.

The information in Table 4 is useful in explaining the seasoning phenomena, especially when the efficiency improvements and pollution reductions extend for long periods after the catalyst injection ceases. The term "well seasoned" is meant to convey that the interior surfaces of the combustion chamber have been exposed to the catalyst reactions and trace levels of various other elements typically found in fuels. Even after thorough cleaning the positive effects continue indicating the metal combustion chamber walls have acquired a long term "seasoned" state. Particle activity caused by select catalysts produces extremely high temperature events causing the catalysts to become embed and sometimes fused or alloyed in the chamber's base materials on atomic and molecular levels. Additionally, catalyst particulate condensation and adherence to chamber surfaces and embedded in microscopic crevices and intergranular spaces of metals and insulation then serve as origin points for the enhanced activities of this catalyzed process.

When attempting to determine concentrations of the catalysts in the high temperatures of the gas phase, concentration values cannot be directly measured because at the lower temperatures at which gas analysis systems operate the catalysts being measured will condense. For example, the lithium collected in the gas samples will condense into liquid or solid phases. This therefore requires that control parameters must be inferred from the measurable results of other materials present as a gas, such as changes in $CO_2$, NOx, SOx, CO, oxygen, or measurement of monatomic species from the gas and plasma phases. These pollutants and other monatomic element concentrations as well as other gases and molecules will serve as criteria for process control through inferred levels of catalyst concentration as determined by results produced. An important criteria is that the process described herein produces lower levels of $CO_2$ and these lower levels can be monitored controlled and optimized. The reduction of all pollution levels including $CO_2$ have been demonstrated using this same process in many tests as indicated in the attached figures.

Because of the complex nature of the reactions occurring a number of materials were found to act as catalysts to this process. However, these same compositions and elements can also moderate and even turn off the beneficial reactions. Adequate levels of the desired reactions can be produced by controlling concentrations of the species which favorably regulate the process in conventional combustion power systems and other gas environments.

Following is a list of species (as elements or parts of compounds) that have been found to be beneficial to the process for producing improved results, and are therefore considered to act as catalysts.
1. Hydrocarbon fuels: oil, gas and coal
2. Ambient air, Nitrogen, oxygen and trace gases.
3. Lithium
4. Alkali metals
5. Hydrogen
6. Helium
7. Water, hydrogen and oxygen and trace elements.
8. Ethanol and other alcohols used as carriers
9. Isopropyl alcohol and other petroleum products and solvents used as carriers
10. Photons
11. Boron
12. Beryllium
13. Background radiation.
14. High voltage sparks and electromagnetic fields, coronal and other high energy discharges Some of these species, for example alkali metals, used in this process have been found to be both initiators and inhibitors in the high energy atmosphere, acting to reduce or prevent the process performance under certain conditions.

On the other hand, the following materials have been found to have a negative influence on process results and therefore should be avoided because of their moderating influence:
1. Absence of helium
2. Nitrogen
3. Oxygen
4. Magnesium
5. Aluminum
6. Silicon
7. Sulfur
8. Elements with higher atomic weights, especially beyond iron and chromium on the Periodic Table.

At least 73 elements found in coal-fired plant emissions are distributed in millions of pounds of stack emissions each year. They include: aluminum, antimony, arsenic, barium, beryllium, boron, cadmium, calcium, chlorine, chromium, cobalt, copper, fluorine, iron, lead, magnesium, manganese, mercury, molybdenum, nickel, selenium, silver, sulfur, thorium, titanium, uranium, vanadium, and zinc. To improve combustion results the presence of these naturally occurring materials should be monitored and controlled as they can have a negative effect on the process.

It has been found that use of high voltage spark systems along with the lithium catalyst was effective in producing pollution reductions especially CO reductions in the 90% range. High voltages (10,000 to over 25,000 volts) were also associated with increased oxygen levels and increased efficiency and therefore qualifies as an initiator and catalyst as well as many other high voltage sources such as uranium, thorium and polonium.

Provided herein are representative examples using processes incorporating features of the invention. These processes are set forth to aid in an understanding of the invention but are not intended, and should not be construed, to limit in any way the invention as set forth in the claims which follow thereafter.

EXAMPLE 1

Two vehicles, one a diesel powered farm tractor and the second a gasoline powered pick-up truck were tested using the process. For the gasoline powered Dodge pickup truck, a mix of 3.3 milliliters per gallon of gasoline was used. The isopropyl additive mix, contained 30 grams of lithium nitrate per gallon. This was poured straight into the fuel tank. The gas powered light truck first produced a drop in $CO_2$ of 52%, and then it went to a 93% after accumulating about 50 road miles. The exhaust gas samples were measured near the engine exhaust before the catalytic converter. For the diesel tractor, a mix of 5 milliliters per gallon of diesel was used from the same isopropyl additive mix containing 30 grams of lithium nitrate per gallon. This was also poured straight into the fuel tank. Exhaust gas samples were drawn directly from the engine exhaust. The diesel engine's $CO_2$ level dropped by 94% from baseline tests after catalyst treatment after running for about an hour. Gas samples were tested both on-site and at a near-by laboratory.

EXAMPLE 2

A 5 month test was conducted on a natural gas fired boiler rated at 12 million BTUs per hour which providing steam for utilities service at a UC Irvine. The lithium nitrate in this case was mixed in water and fed into the gas burner using a humidification system with an average concentration of the lithium nitrate to the average natural gas burn of 5 parts per million. A series of 7 analysis towards the end of this testing period indicated $CO_2$ averaging 73% below theoretical. The plant installed oxygen analyzer; a portable Combustion Analyzer and a set of absorption chemical $CO_2$ instruments were used for the test. In one case, at a constant 2.2% oxygen reading, the theoretical % $CO_2$ for natural gas should have had a corresponding value of 12%, but the actual value of $CO_2$ averaged a much lower 3.13% indicating the drop in $CO_2$ of 73%.

EXAMPLE 3

Drop-tube combustion testing of coal samples using a target concentration for the catalyst of 5 parts per million using a water mix dripped coal samples provided the follow results:
Carbon Dioxide (CO2) reductions of 30% and 53%
Nitrous Oxide (NO) reductions of 58% and 77%
Sulfur Oxide (SOx) reductions of 8% and 40%

EXAMPLE 4

Test conducted using ASTM D-240 the Standard Test Method for Heat of Combustion of Liquid Hydrocarbon Fuels by Bomb calorimeter. This test utilized 1 milliliter of a lithium isopropyl mix producing a concentration of 2.6 parts per million in each fuel. This composition produced the following results:

| Fuel | Energy Increase |
| --- | --- |
| Gasoline 84 Octane | 7.0% |
| Gasoline 97 Octane | 8.4% |
| Kerosene | 9.5% |
| Diesel #2 | 10.0% |
| Ethanol | 10.3% |

EXAMPLE 5

Tests conducted using ASTM D-5865, the Standard Test Method for Gross Calorific Heat Value of Coal and Coke. Using an aqueous solution with a target of 5 parts per million lithium nitrate produced the following results:

| Before Btu/lb | After Btu/lb | Percent Change |
| --- | --- | --- |
| 9,126 | 11,134 | 22% |
| 8,359 | 12,489 | 50% |
| 7,247 | 14,759 | 104% |

EXAMPLE 6

Carbon furnace test, with 41 baseline measurements validating the test bed, all indicated $CO_2$ within the proper 19.6% range for anthracite grade fuel. The lithium catalyst dissolved in water was used to wet down the carbon briquettes. Concentrations varied from a few parts per million to 1-5% lithium nitrate. The object of this test was to verify that $CO_2$ could be reduced with the catalyst. The test series produced 23 successful test runs indicating lower $CO_2$ levels. The highest $CO_2$ reduction recorded was 47% with a $CO_2$ level reduced to 10.3% from 19.5%. These tests shown below clearly indicated that $CO_2$ can be eliminated in the combustion phase of fossil fuels.

Follow up test with 10 grams of potassium catalyst in the form of several 2 to 4 gram nuggets were dropped on the fuel bed during combustion followed by 22 additional test runs which produced a maximum $CO_2$ reduction of 31% ,down to 13.5% $CO_2$ from the 19.5% baseline. The object of this experiment was to coat the furnace walls and interior of the combustion system with potassium, (K-40) to increase the activation area.

| | Carbon dioxide Reduced in Combustion Plasma % $CO_2$ standard for anthracite is 19% to 20% The catalyst in this test series produced much lower levels. | | |
| --- | --- | --- | --- |
| Test No. | $CO_2$ Reduction | New % $CO_2$ Level | Comparable Fuel Type of New % $CO_2$ Level |
| 1 | 41% | 11.4 | Natural Gas |
| 2 | 32% | 13.2 | Natural Gas |
| 3 | 30% | 13.6 | Propane |
| 4 | 22% | 15.2 | Gasoline |
| 5 | 22% | 15.3 | Kerosene |
| 6 | 20% | 15.7 | #2 Diesel Fuel |
| 7 | 19% | 15.8 | #4 Fuel Oil |
| 8 | 19% | 15.9 | #4 Fuel Oil |
| 9 | 16% | 16.4 | #5 Residual Oil |
| 10 | 14% | 16.8 | #6 Residual Oil |
| 11 | 11% | 17.4 | Tar & Pitch |
| 12 | 9% | 17.8 | Tar & Pitch |
| 13 | 7% | 18.1 | Bituminous Coal |

EXAMPLE 7

FIG. 1 shows results measured during a typical batch carbon burn off. During each of these tests the fire zone was closely observed as it burned down, producing the accompanying combustion intensity profile as indicated by temperature and visual indications relative to the carbon dioxide levels which were measured at the same time.

EXAMPLE 8

Figure 2:
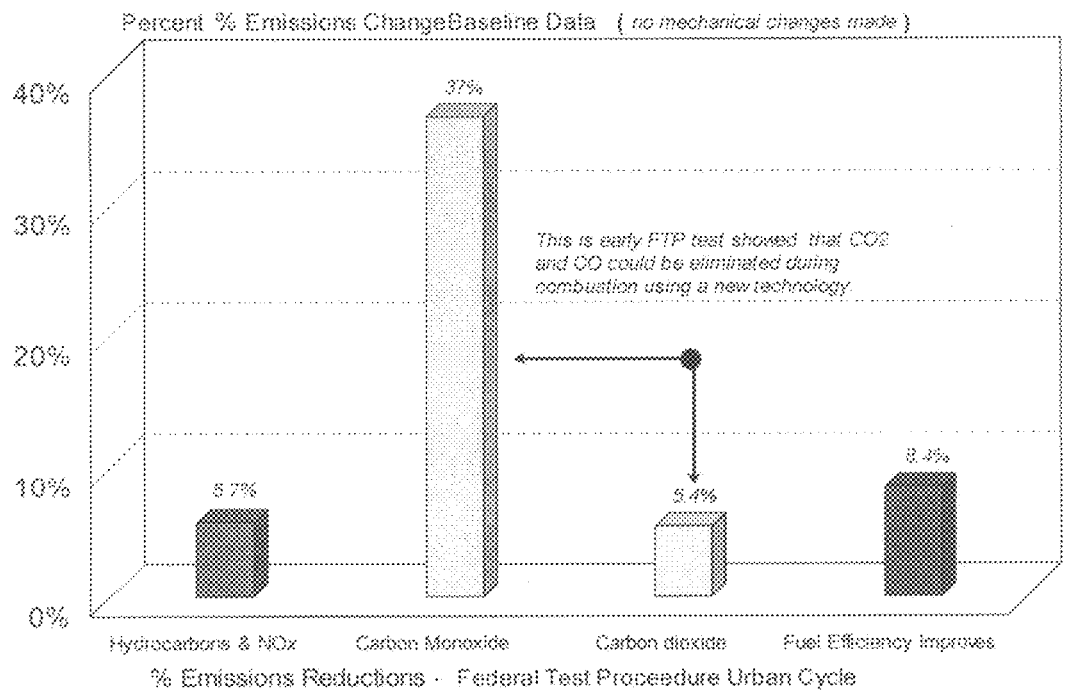
FIG. 2 shows results of the process in automotive tests using Federal Test Procedure protocol.

FIG. 2 shows test results at an automotive emissions testing laboratory using Federal Test Procedure protocol. A reduction of carbon monoxide of 37% and a reduction of carbon dioxide of 5.4% was produced. Also fuel efficiency increased by 8.4% using a 5 parts per million concentration of lithium nitrate dissolved in ethyl alcohol mixed with the test fuel.

EXAMPLE 9

Results of test using alkali metals other than lithium are shown in Table 5. Alkali metals other than lithium can be used in the reaction to reduce $CO_2$. Table 5 shows results when magnesium nitrate and potassium nitrate compositions were added to the fuel. The vehicle was a 1966 Ford Mustang which had no catalytic converter or Engine Control Unit.

TABLE 5

| Test | Carbon Monoxide % | % Change | Carbon Dioxide % | % Change |
|---|---|---|---|---|
| Baseline | 1.75 | | 13.1 | |
| Fuel 2 | 1.36 | −22.3% | 9.54 | −27.2% |
| Fuel 3 | 1.39 | −20.57% | 11.34 | −13.4% |

The baseline fuel was premium gasoline with 50 ml of methanol and 100 ml MTBE per gallon. Fuel 2 was baseline fuel plus 0.625 grams $MgNO_3$ per gallon. Fuel 3 was baseline fuel plus 0.33 grams $KNO_3$ per gallon.

EXAMPLE 10

Figure 3:
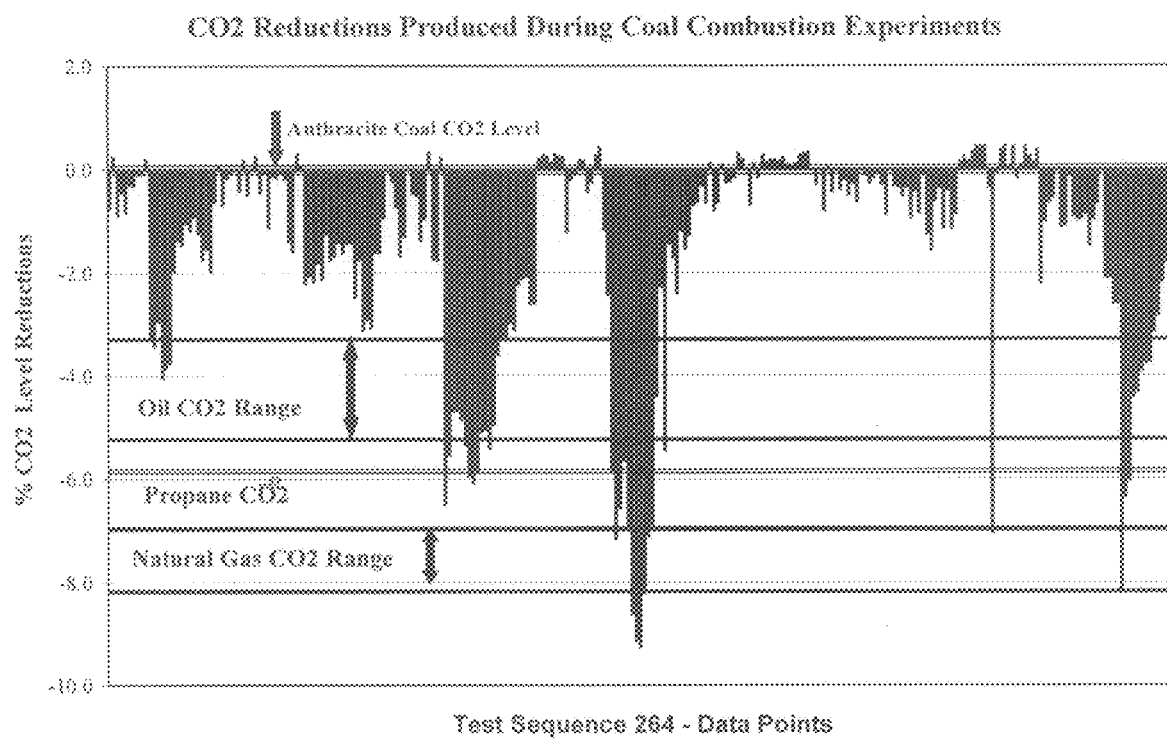
FIG. 3 shows results of a $CO_2$ test series.

FIG. 3 shows $CO_2$ test results for 264 test points. Various concentrations of lithium and potassium were used during these tests; the air-fuel ratios were also changed during the batch burns. The intensity of the burn and levels of seasoning of combustion zone and exhaust system were also varied. These tests were used to establish the dynamics of this process and to identify the control factors needed to optimize $CO_2$ reductions during a complex and varying combustion conditions. The results of this test were used to establish control measures for optimization.

EXAMPLE 11

Figure 4:
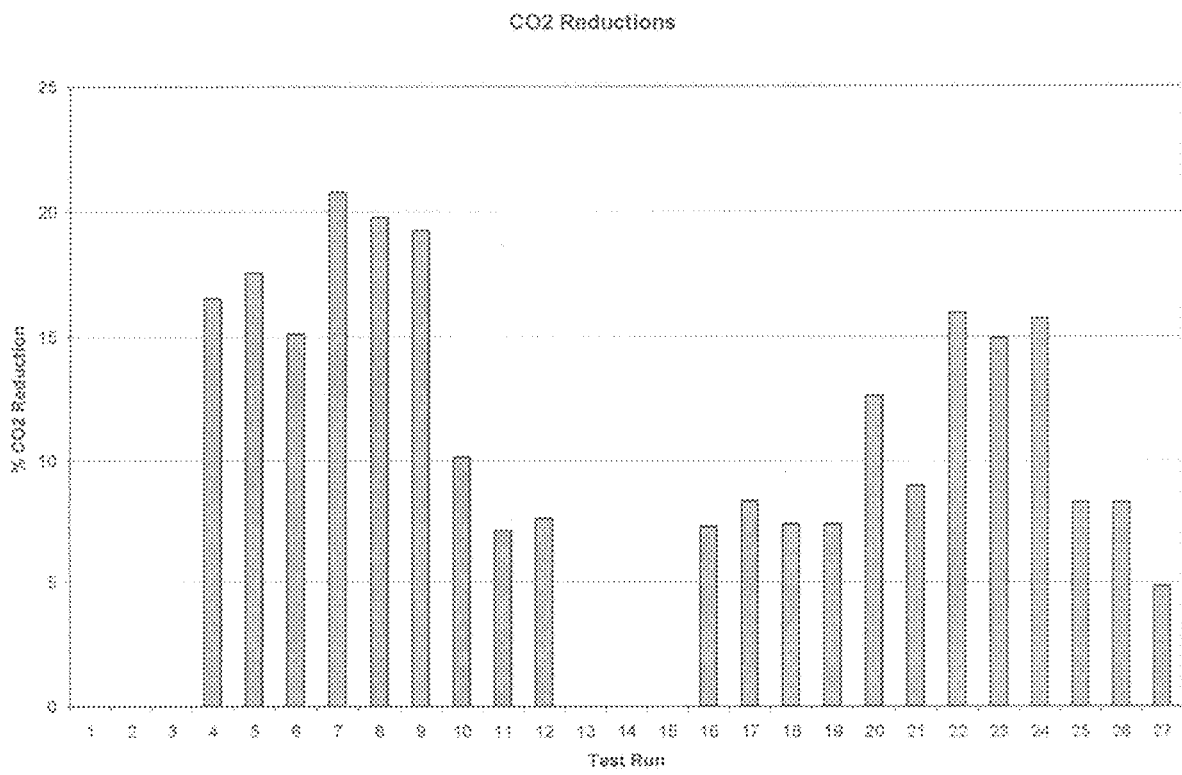
FIG. 4 shows Carbon dioxide reductions using a lithium catalyst.

FIG. 4 shows $CO_2$ reduction during burn tests of anthracite grade briquettes. The highest levels of $CO_2$ reductions occurred during the most intense and hottest period of the burn off. This is the period of the most active boil off of the lithium accompanied by the most turbulent mixing in the gas phase revealing important control elements to be used for optimizing the process.

EXAMPLE 12

Figure 5:
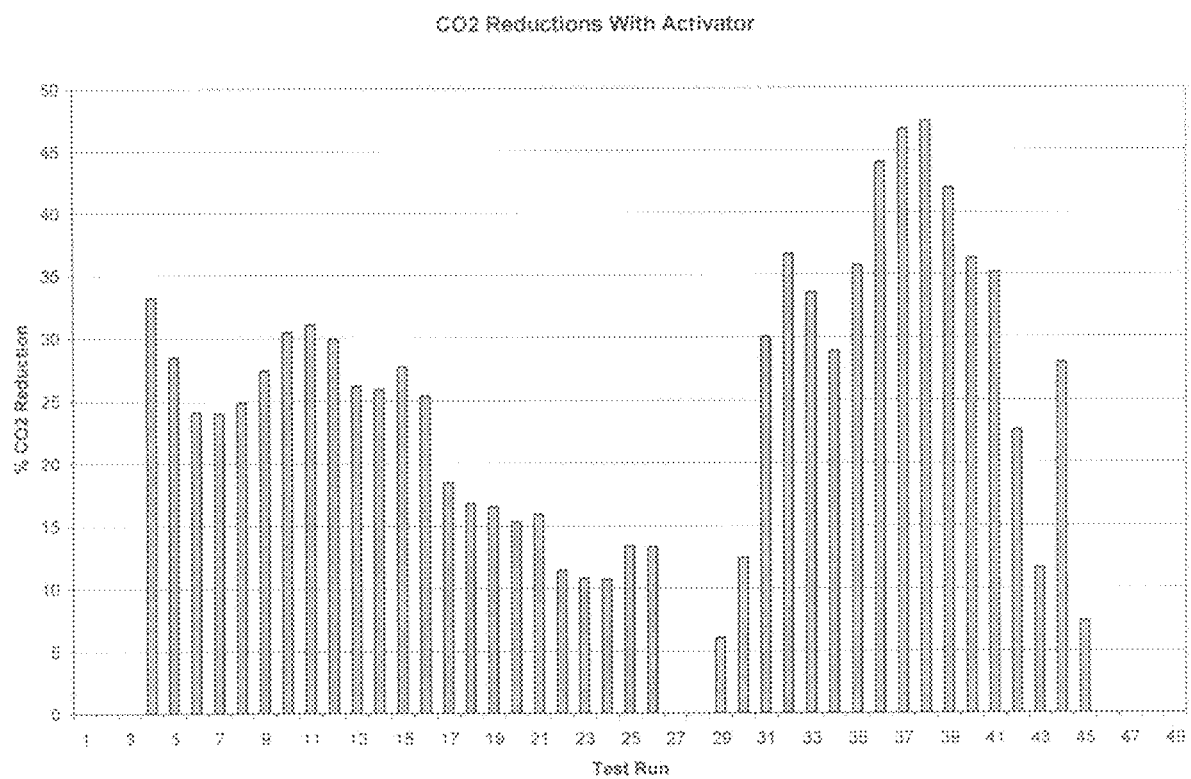
FIG. 5 is a graph showing carbon dioxide reductions using a lithium catalyst in a two batch burn off of high carbon briquettes.
Figure 6:
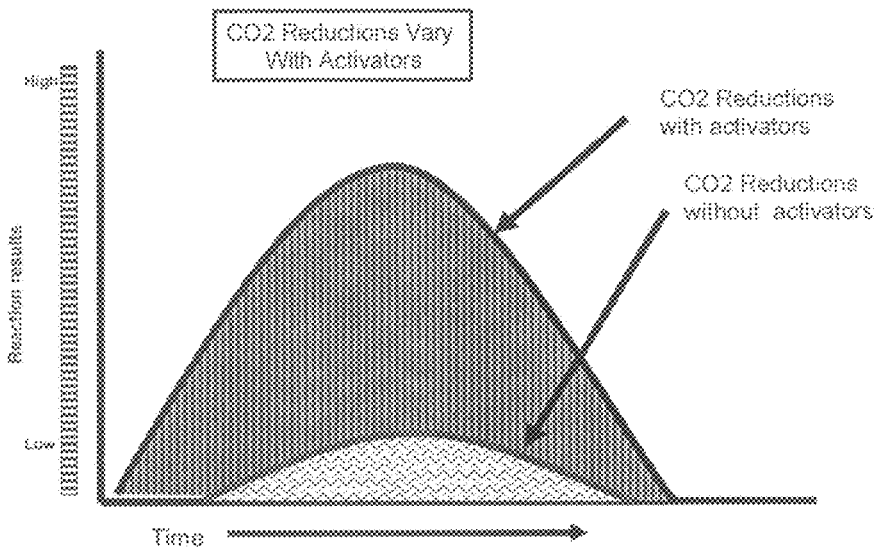
FIG. 6 is a graph showing the benefit of using a potassium activator to produces a greater $CO_2$ reduction in batch type carbon burn off.

FIG. 5 shows the typical $CO_2$ reduction obtained in a series of 264 burns of high carbon briquettes. The highest levels of $CO_2$ reductions occurred during the most intense and hottest period of the burn off. The addition of potassium activator in data runs 29-45 produced significantly higher $CO_2$ reductions. Additionally, the use of the potassium K-40 activator in a well seasoned test furnace produced significantly greater $CO_2$ reductions then in the tests shown in FIG. 4. By "well seasoned" is meant the interior surfaces of the furnace had a thin layer composed of carbons, lithium and other catalysts as well as trace levels of various other elements typically found in fuels and the K-40 activator. FIG. 6 is a different graph showing the benefit of using a potassium activator to produces a greater $CO_2$ reduction in batch type carbon burn off. Other activators such as polonium and thorium have also proven to be effective in carbon dioxide reduction.

Figure 7:
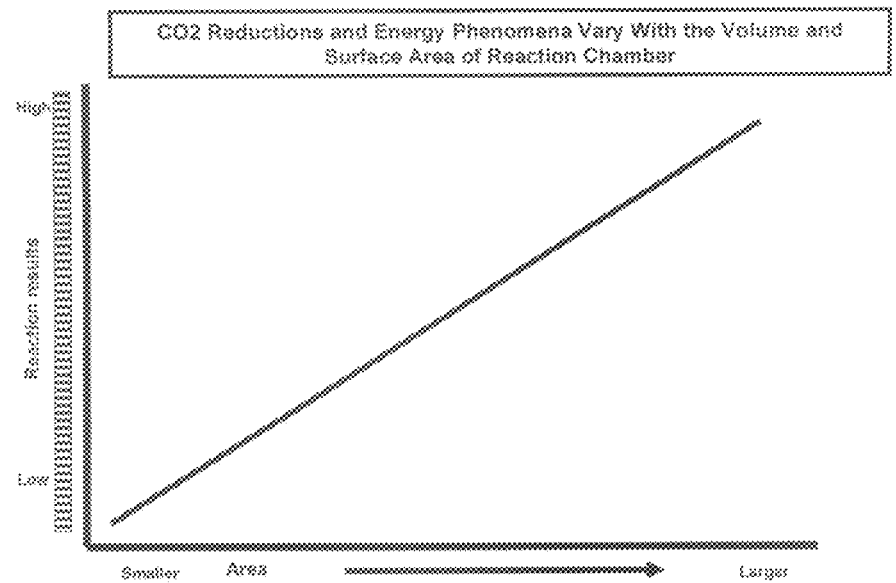
FIG. 7 shows the effect of combustor wall area on $CO_2$ reduction using the process incorporating features of the invention.
Figure 8:
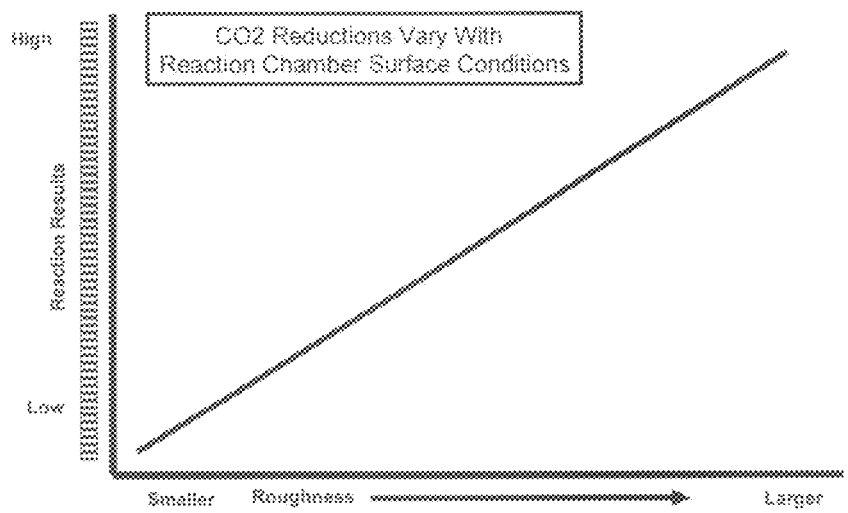
FIG. 8 shows the effect of combustor wall roughness on carbon dioxide reduction.

FIGS. 7 and 8 are graphs that demonstrate that the reduction in $CO_2$ generation increases with the volume of the surface of the combustor and the roughness of the surface, both factors resulting in a greater accumulation of the catalyst on the surface. The reaction zone walls are usually much cooler than the combustion phase. Temperatures as high as 3,500° F. exist near the burner with oil and to 2,500° F. for gas fuels. The melting temperature for lithium is 357° F. and the boiling temperature is 2,448° F. so lithium will be in a vapor phase, liquid phase and the solid phase at different locations depending on localized gas and metal temperatures. Vapor pressures vary with temperature with the lithium solidifying in the cooler regions of combustion chamber. Each combustion process has varying wall temperatures at different locations so this becomes a very complex issue when the differences between diesel engines, gasoline engines, furnaces, boilers and gas turbines are considered. Added to this is the fact that different fossil fuels burn at different temperatures and local air to fuel ratios also produce different flame temperatures. Larger reaction chambers will have larger sweet spots that are most favorable to optimized results. FIG. 7 shows that as larger optimized zones occur, more effective results can be created by increased time in the sweet spot. In regard to FIG. 8, if the condensed lithium fails to make contact directly on a cooler metal surface due to scale or deposits it will be at a temperature greater than the cooler metal surfaces of the combustion chamber and will have a higher vapor pressure or be melted or vaporized having exceeded the boiling point. A roughness in the surface is more likely to capture catalyst particles and resist cleaning activities such as maintenance cycles and soot blowing in the case of units burning residual fuels and solid fuels such as coal. Acids formed by combustion processes may have etched metal surfaces and formed micro crevices which can harbor minute particles of the catalyst. Extended periods of reduced $CO_2$ and pollution and prolonged periods of significantly higher efficiency have been produced by this roughened surface condition resulting in catalyst retained on combustion chamber surfaces.

Figure 9:
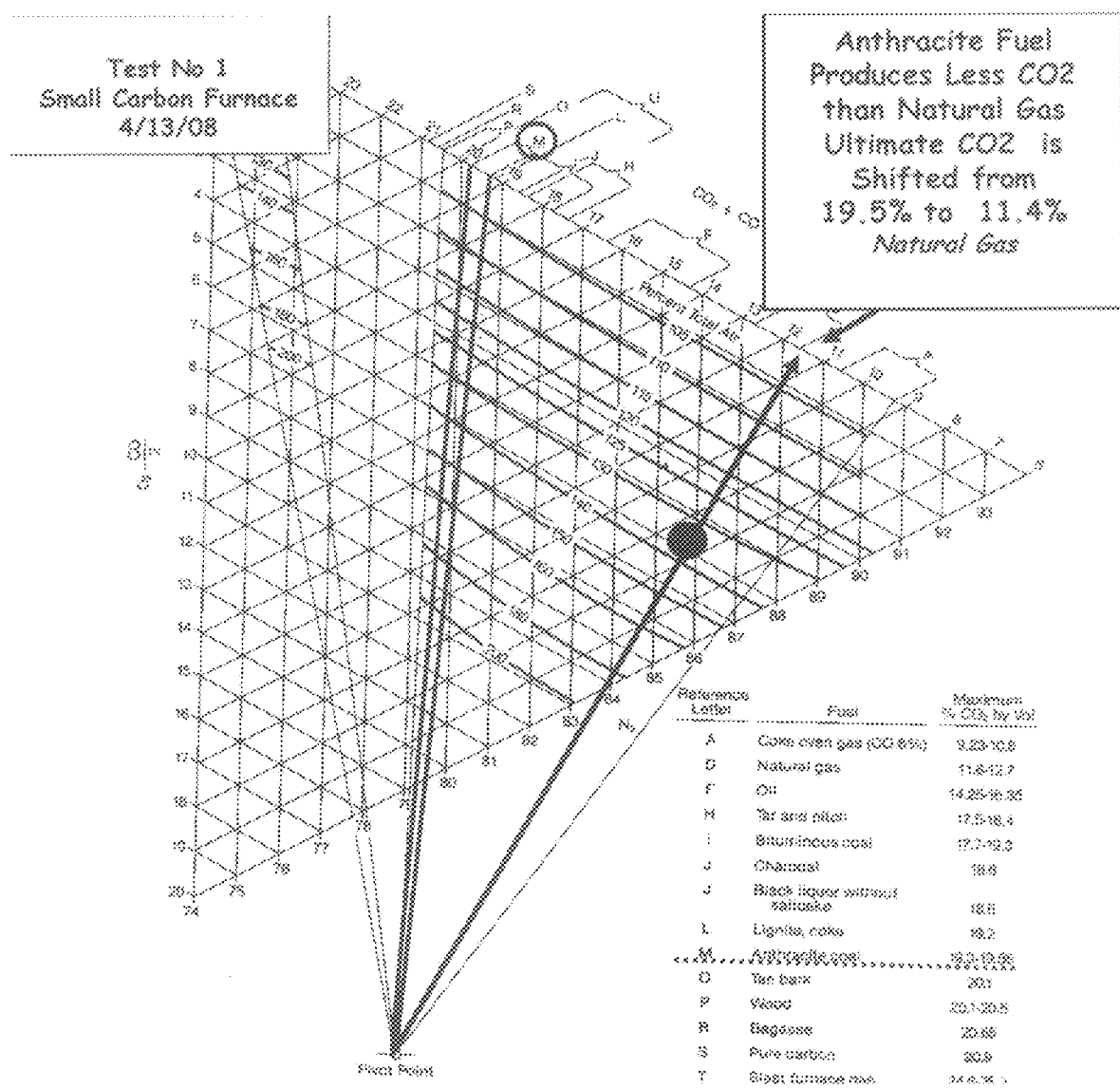
FIG. 9 is a copy of the *Dry Flue Gas Combustion Chart* published by Babcock & Wilcox in the book, *Steam Generation and Use*.

The *Dry Flue Gas Combustion Chart* (FIG. 9) published by Babcock & Wilcox in the book, *Steam Generation and Use,* Chapter 9, is a useful source for interpreting and understanding experimental results relating to the reduction of $CO_2$. This chart was developed when the Orsat three gas analyzer [$O_2$, $CO_2$ & CO] was the primary combustion gas analysis tool. Most modern combustion analyzers used for boiler testing do not measure $CO_2$; they do a mathematical conversion from oxygen readings because this relationship is considered to be constant and unalterable. That is why both modern instruments and older absorption chemical analysis were a useful cross check for $CO_2$ verification as they both measure $CO_2$ but by independent means. The darker lines drawn on FIG. 9 define the zone of correct $CO_2$ measurements for Anthracite coal combustion from 19.3 to 19.85 for the ultimate $CO_2$ value for a stochimetric burn at zero oxygen dilution. If instruments accurately detect $CO_2$ levels outside of this zone, then some change is occurring with the $CO_2$. Accordingly, this graphic serves as a precise cross-check for indications of changes in actual $CO_2$ emissions. The arrow to the right of the Anthracite coal zone pointing to a $CO_2$ level of 11.4% measured by CO2 instruments indicates irrevocable proof of CO2 reduction.

Figure 10:
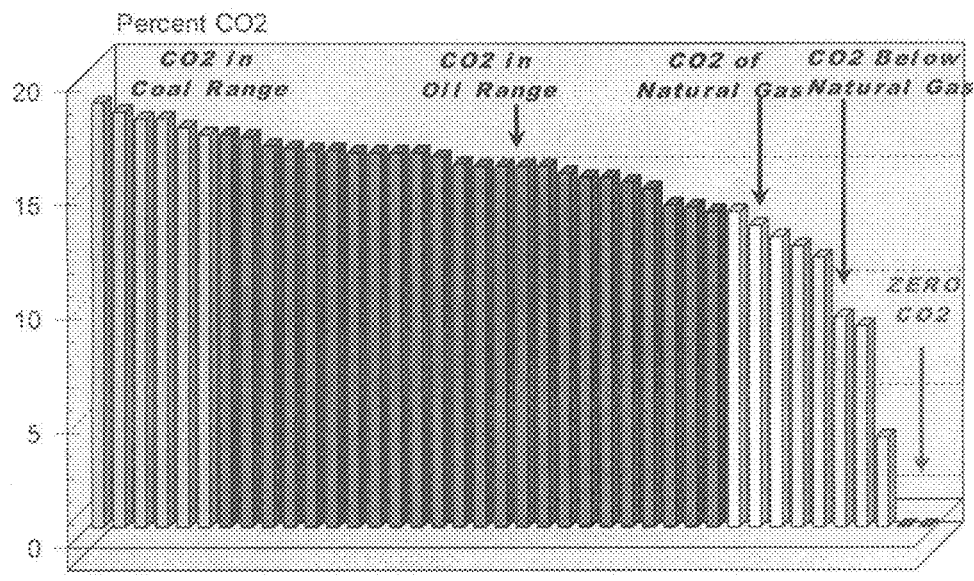
FIG. 10 is a graph showing the $CO_2$ reductions produced in a furnace burning anthracite coal.

FIG. 10 shows the $CO_2$ reductions produced in a furnace burning anthracite coal. In this case the original $CO_2$ value for coal was 19.5%. During testing the $CO_2$ value dropped to a level below natural gas to a point where no $CO_2$ could be detected.

This same process, as shown in Tables 6 and 7, produces excess heat well above the standard Higher Heating Values for fossil fuels.

TABLE 6

Standard Test Method for Gross Calorific Value of Coal and Coke

| Fuel Type | Before Btu/lb | After Btu/lb | Percent Change |
|---|---|---|---|
| Coal & Petroleum Coke | 8359 | 12489 | 50% |
| Coal | 9126 | 11134 | 22% |
| Coal | 7247 | 14759 | 104% |

Table 6 sets forth the data obtained in a laboratory coal testing program complying with ASTM D-5865, the Standard Test Method for Gross Calorific Value of Coal and Coke in a series of tests utilizing a process incorporating features of the invention. The tests produced increased heat values (the "after" values) of 22%, 50% and 104%.

TABLE 7

| Fuel | Energy Increase |
|---|---|
| Gasoline 84 Octane | 7.0% |
| Gasoline 97 Octane | 8.4% |
| Kerosene | 9.5% |
| Diesel #2 | 10.0% |
| Ethanol | 10.3% |

Figure 11:
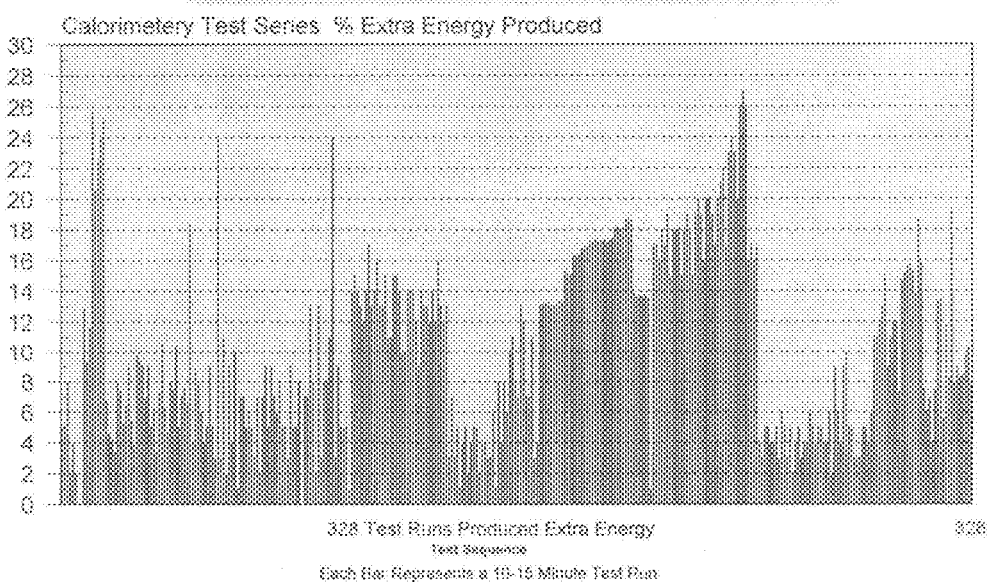

FIG. 11 is a graph showing over 300 boiler tests with efficiencies significantly higher than the design values for various boilers they were run on. As set forth below, these test demonstrate
1. The seasoning effect of catalyst and its persistence
2. The effect of ultra low catalyst levels producing very high efficiency improvements
3. The production of oxygen
4. The effect of ethanol and water significantly improves results
5. Very high efficiency gains
6. Very high pollution reductions, especially carbon monoxide The zero baseline represents the basic efficiency for the boilers tested or, in some cases the Heat-Loss efficiency measured at the time of the test, considered to be within 1% of the calorimetric measurements shown, usually labeled Output-Input efficiency in ASME Boiler Test Codes. A high level of repeatability is shown to exist in more than 300 boiler tests which have produced efficiencies significantly higher than design values for various boilers they were run on.

While $CO_2$ values were not obtained in this test series, it was found that there were consistent large reductions in carbon monoxide and an increase in oxygen generation (see Boiler Tests 9-13 and 15 listed, in Table 8 below), strongly suggesting a reduction in $CO_2$ as follow up experiments proved.

TABLE 8

| | Measured Change | Percent Change |
|---|---|---|
| Boiler test No. 9 | | |
| Oxygen | 3.6% to 7.8% | 217% |
| Carbon monoxide | 130 to 19.7 ppm | 85% |
| Efficiency improvement | | 7.8% |
| Comments: 4 hours 25 test points 10 min each | | |
| no catalyst only ethanol + water added to fuel | | |
| Boiler test No. 10 | | |
| Oxygen | 2.7% to 9.3% | 344% |
| Nitrogen oxides | 117 to 1 ppm | 99% |
| Carbon monoxide | 130 to 19.7 ppm | 85% |
| Efficiency improvement | | 12% |
| Comments: 2.25 hours 13 test points 10 min each | | |
| Catalyst and ethanol + water added to fuel | | |
| Boiler test No. 11 | | |
| Oxygen | 2.5% to 8.8% | 346% |
| Nitrogen oxides | 96 to 53 ppm | 46% |
| Carbon monoxide | 281 to 19 ppm | 93% |
| Efficiency improvement | | 19% |
| Comments: 7 hours 40 test points 10 min each | | |
| No Catalyst only ethanol + water added to fuel | | |

TABLE 8-continued

| | Measured Change | Percent Change |
|---|---|---|
| Boiler test No. 12 | | |
| Oxygen | 2.3% to 8.8% | 380% |
| Nitrogen oxides | 102 to 48 ppm | 53% |
| Carbon monoxide | 95 to 0 ppm | 100% |
| Efficiency improvement | | 27% |
| Comments: 7 hours 41 test points 10 min each | | |
| No Catalyst or ethanol | | |
| Thoroughly cleaned boiler before test and replaced ceramic furnace liner | | |
| Boiler test No. 13 | | |
| Oxygen | 2.8% to 9.2% | 317% |
| Nitrogen oxides | 115 to 48 ppm | 58% |
| Carbon monoxide | 70 to 0 ppm | 100% |
| Efficiency improvement | | 25% |
| Comments: 7 hours 40 test points 10 min each | | |
| No Catalyst or ethanol | | |
| Boiler test No. 15 | | |
| Oxygen | 1.6% to 2.5% | 36% |
| Nitrogen oxides | 136 to 81 ppm | 40% |
| Carbon monoxide | 3,000+ to 0 ppm | 100% |
| Efficiency improvement | | 10% |
| Comments: 6 hours 37 test points 10 min each | | |
| No additive seasoned during test 14 | | |

Figure 12:
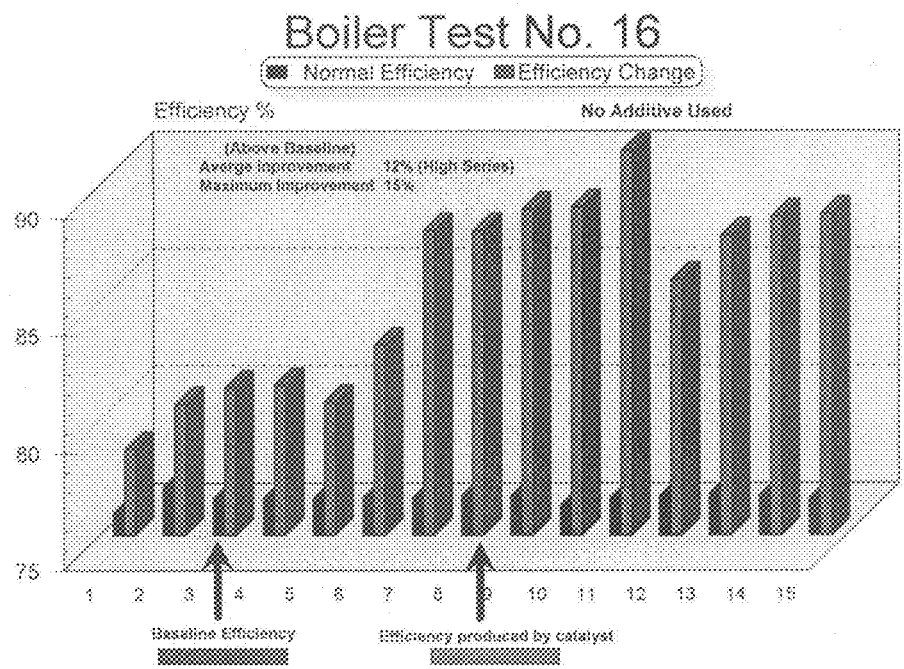
FIG. 12 illustrates the before and after results from a boiler test.
Figure 13:
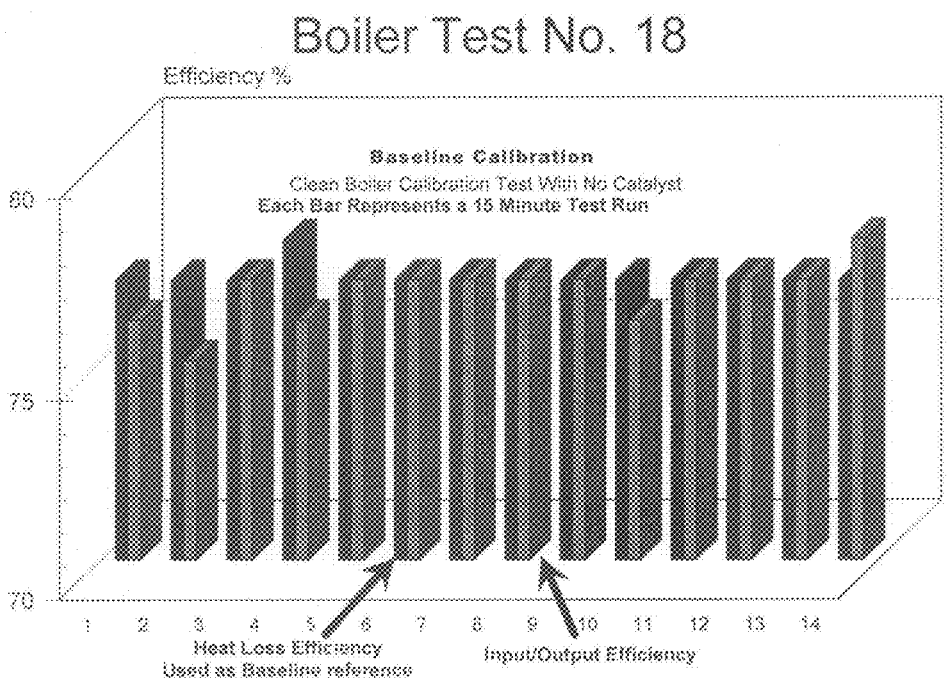
FIG. 13 shows a calibration check for the accuracy and repeatability of a test boiler comparing heat loss measurements to calorimetric measurements.

FIGS. 12 and 13 illustrate the results from Boiler test 16 and 18 respectively. Referring to FIG. 12, the results in this graphic were produced within a boiler previously treated with catalyst. The boiler was cleaned and no catalyst was subsequently introduced into the boiler. After an estimated 25 hours of operation without catalyst in an attempt to burn out any possible tenacious residue that might have remained after thorough cleaning of the chamber and replacement of the firepot's ceramic liner. During cleaning the catalyst deposits easily washed away with water wash down. However, the pollution reductions and high efficiency levels persisted for an additional 50 more hours of testing. The gradual increase in efficiency in FIG. 12 could not be accounted for by subsequent catalyst vapor release from the furnace walls as surface deposits had been thoroughly cleaned. It is noted as the temperatures of the furnace continue to rise during this test, the efficiency continued to increase. A seasoning effect of metal components in the firepot zone was suspected as the source of this phenomenon. Accordingly, the furnace and heat exchangers were once again disassembled and thoroughly cleaned, although no deposits were observed on any components in the high temperature zone. All fire box components were then replaced including a new metal factory supplied firebox and a new factory ceramic liner. During subsequent testing the Output-Input efficiencies returned to normal levels shown in FIG. 13. This disclosed a different nature of seasoning, namely metallurgical conditioning.

Referring to FIG. 13, following catalyst use only after dismantling and cleaning the boiler for a second time and after replacing its steel base and firebox ceramic insulation, did the unit finally came back to normal and expected (lower) efficiency levels. By way of explanation the heat Loss efficiency and Input-Output efficiency should agree very closely in a well instrumented boiler as shown in this figure. The efficiency differences measured with the catalyst runs were well beyond the slight margin of error experienced during this calibration test.

Figure 14:
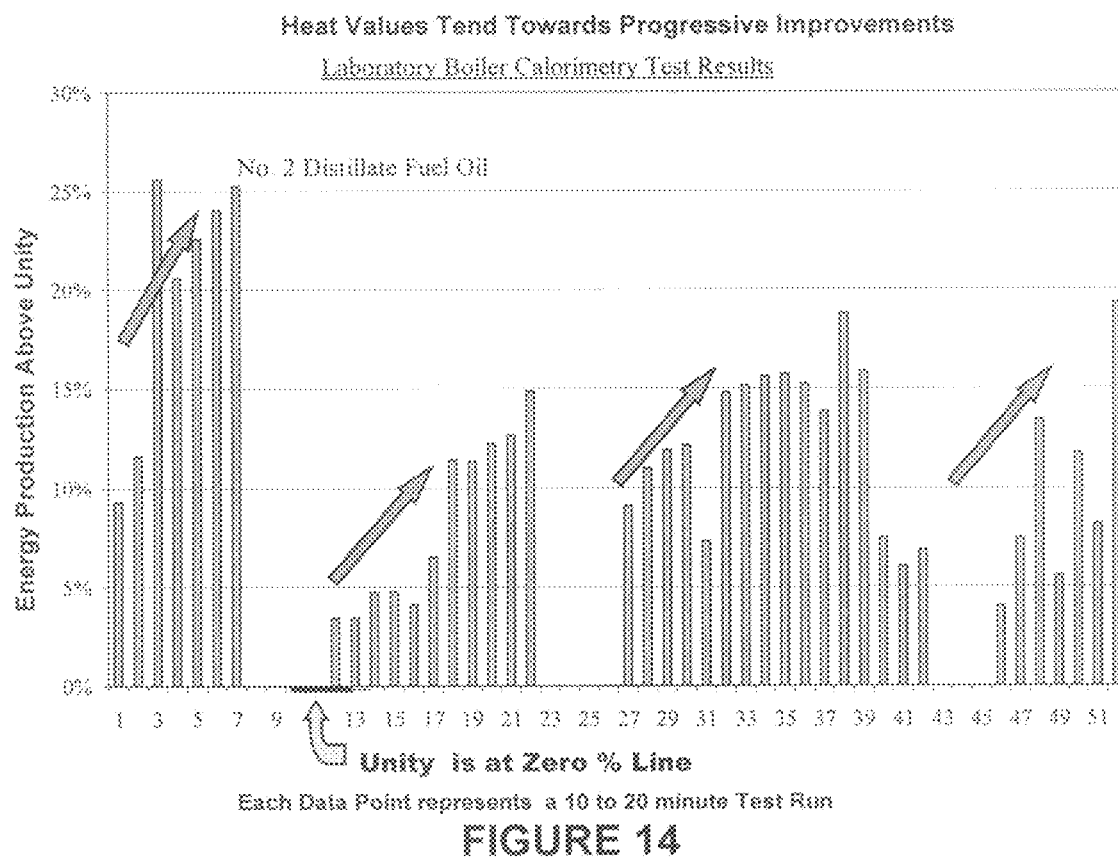
FIG. 14 shows the effect of addition of lithium catalyst on energy output in a series of 4 boiler tests.

FIG. 14 shows the effect of combustion zone conditions on heat output. During the early tests many attempts were made to correlate performance changes such as emissions reductions, CO2 reduction and increased heat production with changes in catalyst concentration. Extensive testing and data showed that no correlation occurred even though the lithium nitrate injection was varied over an appreciable range between zero and 500 parts per million. A correlation was discovered between combustion zone temperature, the duration of the experiment. Additionally, the best results were produced after thorough seasoning of the combustion equipment combined with no new catalyst input, which becomes a moderator at some point shown in FIGS. 16 and 17. This fact is reinforced by FIG. 15 where the energy output spikes when the catalyst introduction was cut off at the end of some early tests in an attempt to reestablish original efficiency conditions. The boiler for this test series burned diesel fuel using a commercial power burner at steady state conditions. A long warm up period preceded data recording to insure that thermal equilibrium had occurred before measuring changes produced by the catalyst.

Figure 15:
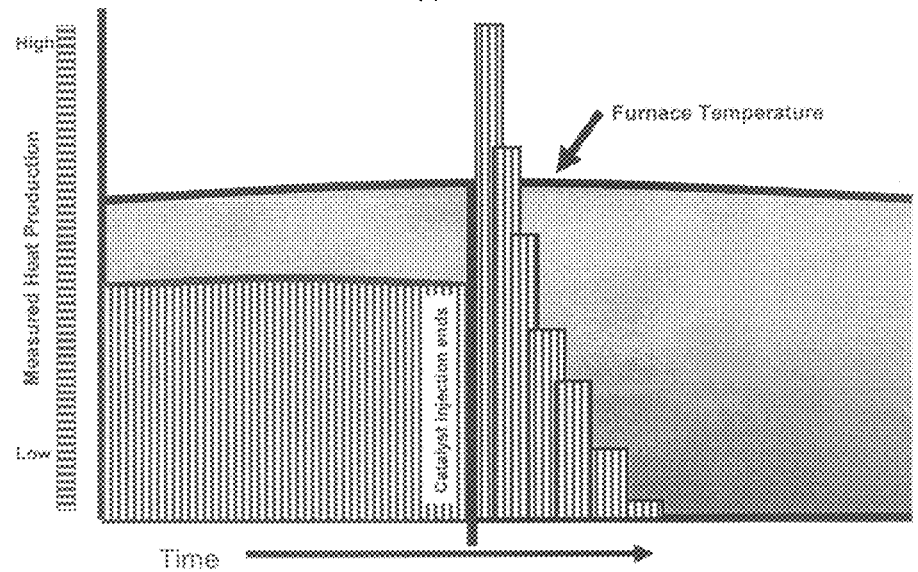
FIG. 15 illustrates the energy spike following catalyst delivery followed by a decrease of energy output.

In regard to FIG. 15, certain levels of the catalyst act as a moderator as shown in this illustration. It was noted in one boiler test the energy producing reaction increased by 18.8% immediately after the injection of the lithium catalyst was stopped; just prior to this the same boiler had been operating at a 10.8% level above normal. This is an indication of a self-moderating influence. This illustrates that it is advantageous to reduce catalyst delivery after initial benefits are noted.

Table 9 lists improved efficiency over base line and heat output increase for three test series (Test 5-7) at different lithium catalyst delivery rates. Tests 5 and 7 illustrated improved efficiency even after catalyst delivery was stopped. During boiler test number 5 the excess energy spiked immediately after the catalyst feed rate was cut back from 185 PPM to zero. During the next 17 minutes the heat output increased by 12% to 18% above the original baseline efficiency then fell off to lower levels. During boiler test number 7 the excess energy spiked after the catalyst feed rate was cut back from 27 milliliters per minute to 0. During the next 30 minutes the heat output increased by 14% to 24% above the original baseline efficiency, then fell back to a much lower efficiency level.

Test 6 (Table 8) illustrates a retarding effect by increasing catalyst delivery and then an improved efficiency by a reduction of catalyst to former delivery levels. During boiler test number 6 the excess energy spiked immediately after the catalyst feed rate was cut back from 41 milliliters per minute to 18. During the next 30 minutes the heat output increased by 22% to 24% above the original baseline efficiency

TABLE 9

| Catalyst Feed Rate ml/min | Efficiency Improvement Above Baseline | Heat Output Increase |
|---|---|---|
| Test No. 5 | | |
| 5 | 5% | |
| 6 | 7% | |
| 5 | 7% | |
| 7 | 6% | |
| 0 | 18% | 12% |
| 0 | 4% | |
| 0 | 9% | |
| Test No. 6 | | |
| 19 | 5% | |
| 19 | 9% | |
| 19 | 5% | |
| 41 | 3% | |
| 18 | 24% | 22% |
| Test No. 7 | | |
| 37 | 3% | |
| 34 | 8% | |
| 27 | 8% | |
| 1 | 11% | |
| 0 | 24% | 14% |
| 0 | 3% | |

Figure 16:
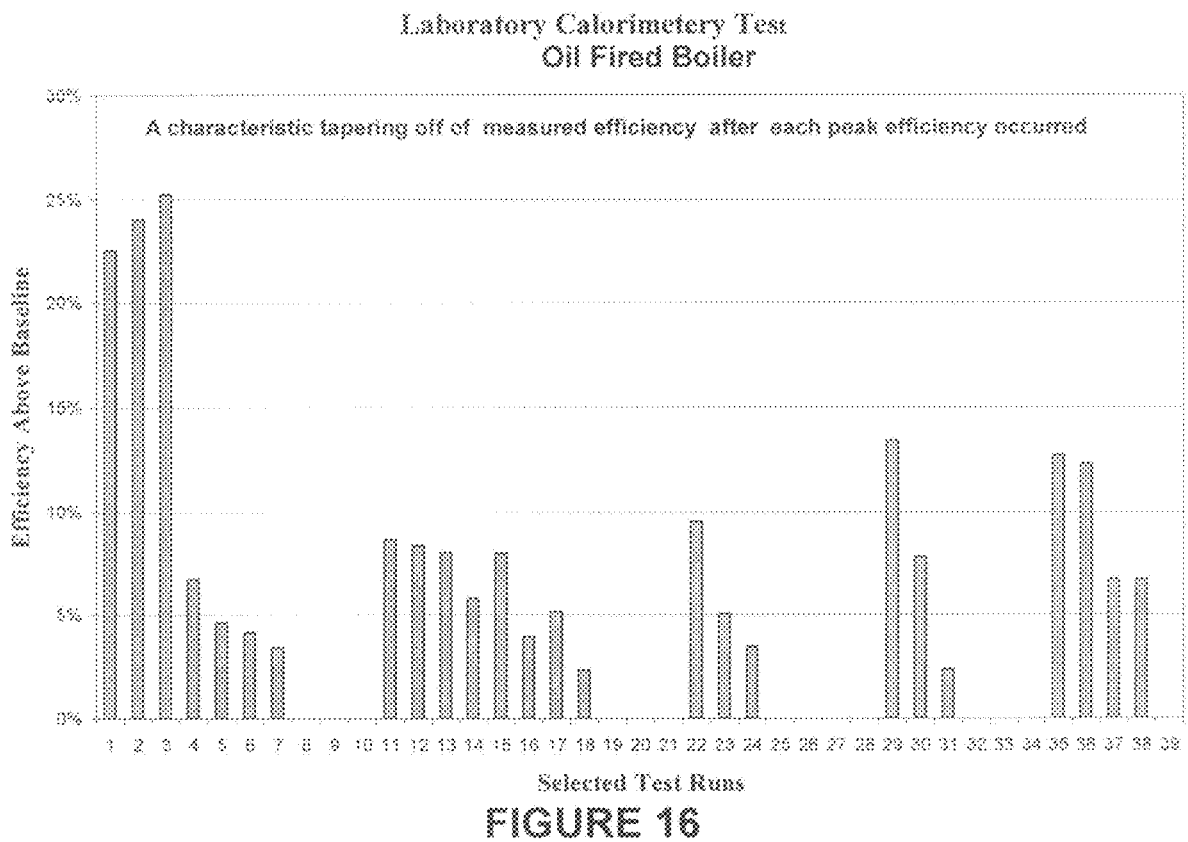
FIG. 16 illustrates several examples of excess energy caused by the catalyst delivery peaking and then falling off after moderating influences came into play.

FIG. 16 shows several occasions when the excess energy caused by the catalyst reaction peaked and then fell off after moderating influences came into play. This is a sample from 40 recorded test runs examined. In this case the catalyst itself, because it was the only variable being introduced into the process during testing of an oil fired boiler, was determined to be the cause of the moderating influence which at first caused higher efficiencies then caused efficiencies to diminish.

Figure 17:
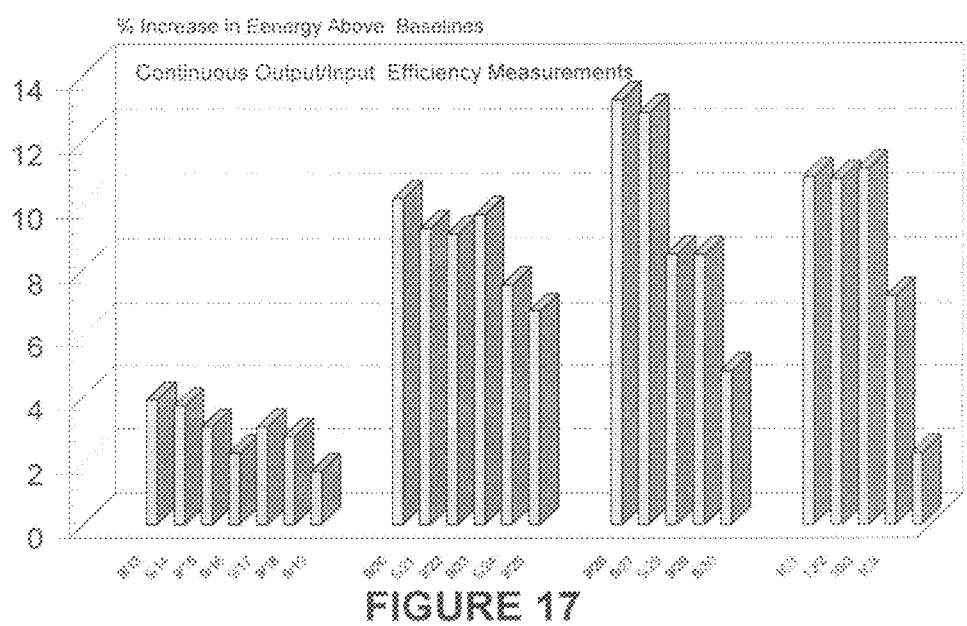
FIG. 17 illustrates the operation over a 1 month period of a 500,000 million BTU per hour refinery boiler.

FIG. 17 shows that the efficiency peaked four different times during a month long test of a large 500,000 million BTU per hour refinery boiler and then dropped off because of moderating influences. Because of the many influences that may be presented to the process control of this technology, optimum results requires the use of various analytical instruments such as a gas chronograph and spectrum analyzers to identify the cause of changes and then use this information to fine tune the process. There are many candidate moderators which exist as trace elements and compounds in the fuel, boiler deposits, metallurgy of boiler internals, dust composition and concentration and control room firing adjustments. These are in addition to carefully controlling the catalyst species and concentrations and the combustion air supply.

Figure 18:
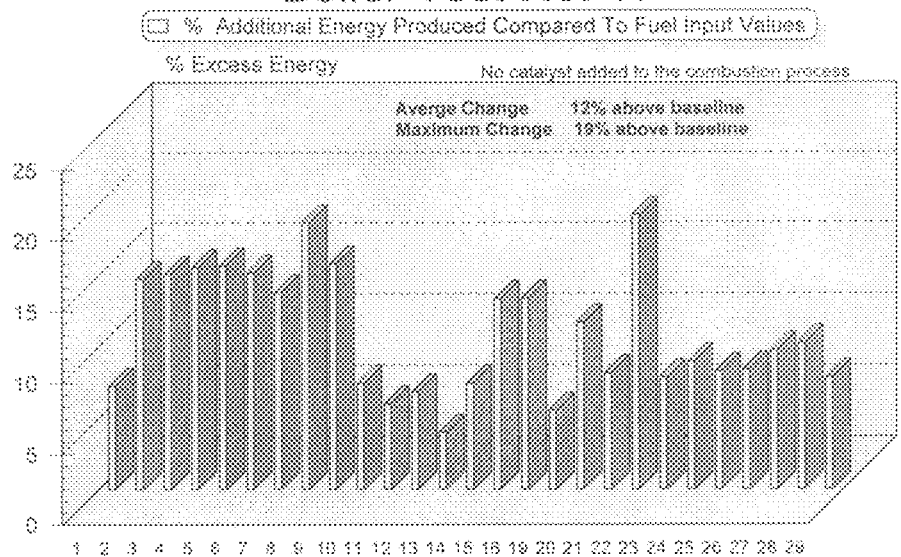
FIG. 18 illustrates an effort to return the test boiler to its original baseline condition. In spite of thoroughly cleaning and installing a new insulating ceramic liner efficiency remained significantly above the baseline datum under steady state conditions.

In an effort to return the test boiler to its original baseline condition it was thoroughly cleaned and a new insulating ceramic liner installed in the furnace area. In spite of this clean up action the efficiency remained significantly above the baseline datum under steady state conditions as shown in FIG. 18. The higher efficiency levels had achieved a tenacious level of permanency.

Figure 19:
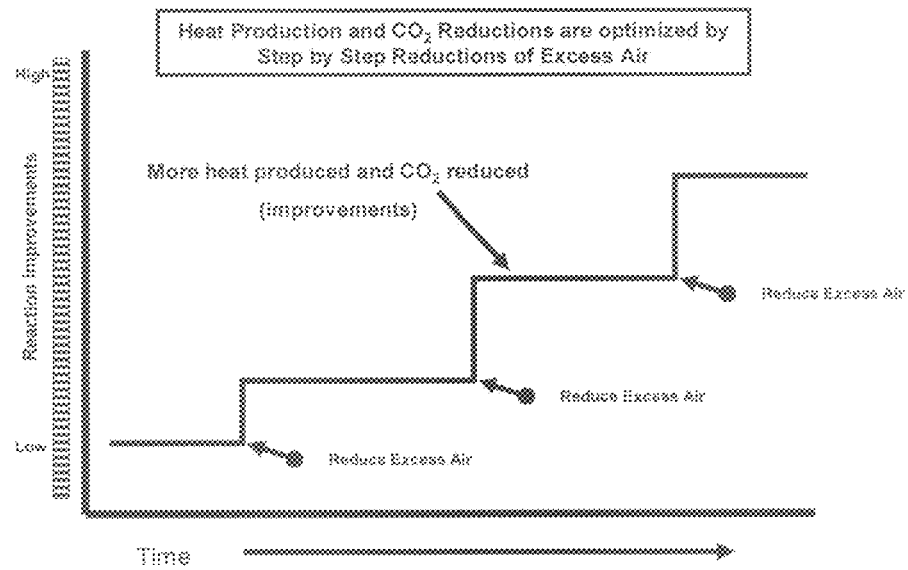
FIG. 19 shows a step-wise optimizing procedure used to gradually reduce carbon dioxide and pollutant emissions as well as improving efficiency.

Various methods of control, relying on various types of instrumentation and observations have proven effective. As a result protocols have been established to effectively control and beneficially exploited the processes described herein. FIG. 19 shows a step-wise optimizing procedure used to gradually reduce carbon dioxide and pollutant emissions as well as improving efficiency. Reducing excess air in well controlled incremental steps as illustrated insured safety and guarded against inadvertent smoke, hydrocarbon and carbon monoxide emissions and also reduced the nitrogen and oxygen levels, which act as moderators to the desired results, in the furnace reaction zone. This method improved the overall effectiveness with a minimum possibility of upsetting the combustion process.

Controlling the optimizing process was done by implementing a series of small incremental steps coordinated with checks on the results as well as cutting back on the air fuel ratios or to reduce the lithium and other alkali catalyst which can also act as inhibitors in the gas phase. There is a fine line between measure and control, taking into account all of the positive and negative factors of catalytic and inhibiting influences affecting the process. A general rule was that when an action produced a positive influence it was increased slightly until desired results tend to flatten out. It was also important to keep good records and watch for additional changes over time. It was expected at some point that an optimized performance would occur. Reductions of CO2 did not necessarily occur simultaneously with reductions of other pollutants or increases in efficiency. This process offered an opportunity for recognizing improvements which may or may not occur under the same control conditions considering the complexity of the variables available for manipulation. This also offered flexibility in results which is one of the advantages of this process.

Figure 20:
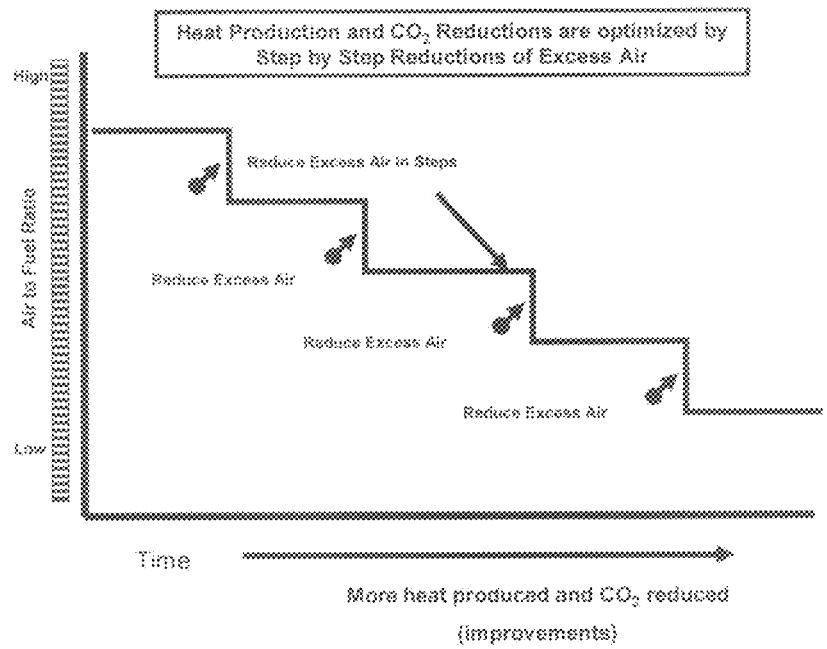
FIG. 20 illustrates the step wise reduction of combustion air which in turn reduced the inhibiting effect of the air on the catalyzed combustion.
Figure 21:
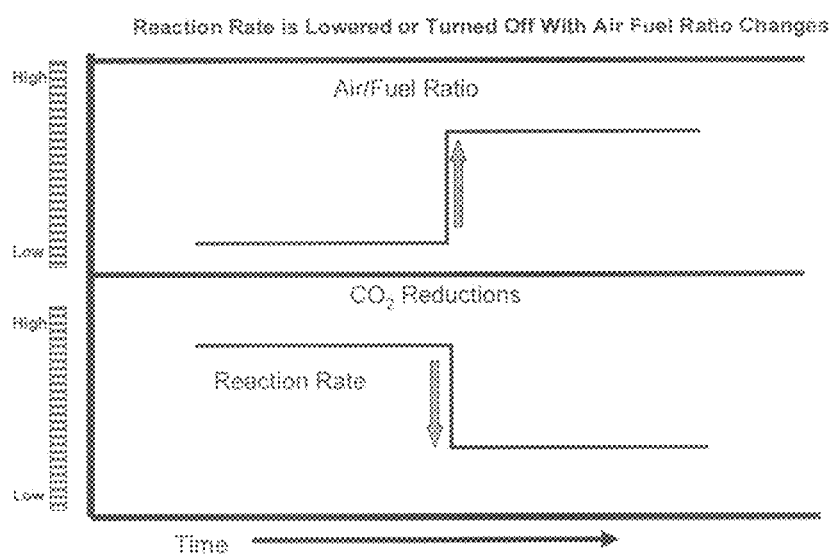
FIG. 21 illustrates the capability to turn off the reaction quickly by sharply increasing the excess air at the burner.

FIG. 20 shows the step wise reduction of combustion air which in turn reduces the inhibiting effect of the air on the catalyzed combustion. Using this procedure, combustion air can be drawn down below original stoichiometric ratios without producing the usual end point effects of smoke, carbon monoxide and hydrocarbon losses while increasing positive results of reduced $CO_2$, pollution and higher efficiency. FIG. 20 also illustrates an important safety feature of the process; specifically, the combustion can be turned off quickly by sharply increasing the excess air at the burner. This can be accomplished automatically using combustion safety controls when the fuel valves are closed. The control system goes through a post combustion purge cycle which uses the combustion air supply to sweep the furnace and boiler of any residual combustion gases or fuel.

As indicated above, extremely small amounts of the catalysts need be delivered. Further, once the combustion chamber is seasoned, or initial quantities of the catalyst are delivered in conjunction with the fuel, because of residual effects of the prior delivered catalyst and the fact that excess quantities of the catalyst may eventually retard the beneficial effects of the presence of the catalyst it is important to monitor the combustion process to maintain an optimum effect. One skilled in the art will recognize that it may extremely difficult to measure and monitor the amount of the catalyst present in the combustion zone because of the minute catalyst quantities present and the high temperatures existing. However, suitable techniques and instrumentation exist for continuously monitoring the flame temperature and the presence of various gases in the exhaust stream including, but not limited to CO, $CO_2$, oxygen and $NO_x$. At the same time, the exhaust should be monitored to determine if an increase in other carbon based pollutants, trace elements in the fuel or unburned fuel show up in the exhaust. Data presented herein show that use of the catalyst under optimum conditions, when compared with the same equipment burning the same fuel without the catalyst present (a base line), results in elevated combustion temperatures and oxygen levels and reduced CO and $CO_2$ levels. Accordingly, following exposure to the catalyst in a seasoned combustion chamber and/or by adding the catalyst in any manner, such as in the fuel, in the combustion air feed, in a solid form to the chamber, etc, when desired operating conditions are reached the catalyst feed can be adjusted so as to maintain those desired operating conditions. For example, if CO and $CO_2$ levels increase and temperature and oxygen decrease catalyst can be added to reestablish desired operating conditions. As excess oxygen appears in the exhaust stream, it is also possible to reduce the air feed to the combustion chamber as such excess oxygen is a sign that the combustion process is running more efficiently and less oxygen is being utilized in producing CO and $CO_2$.

More particularly, a process is described for the combustion of a carbon-based or hydrocarbon fuel in a combustion chamber using the catalyst or catalysts described herein while maintaining or increasing the efficiency of said combustion and reducing the $CO_2$ and the amount of pollutants produced by said combustion, when compared to a control process, are reduced. In a first embodiment an initial quantity of a catalyst is fed to the combustion chamber simultaneous with feeding of the carbon-based or hydrocarbon fuel and an oxygen containing gas at an initial fuel/gas ratio to form a catalyst/fuel mixture followed by igniting said catalyst/fuel mixture to produce a flame and an exhaust stream. The combustion products and temperature of the flame are monitored until a maximize efficiency is obtained. That maximum efficiency can be indicated by a maximized BTU output, horsepower generation, increased stem production, etc. or, for example, the flame temperature. An increased flame temperature is generally translatable to an increased efficiency of the combustion process for that combustion chamber as it indicates that more energy is being generated from the fuel fed to the combustion chamber. The components of the exhaust stream obtained during the combustion are also monitored during the flame initiation process as well as when the maximize flame temperature is reached. When the factor being monitored as an indication of optimum operation, such as a maximized flame temperature is reached, the catalyst feed is reduced, and optionally periodically adjusting. The quantity of catalyst subsequently delivered is generally less than the initial quantity fed along with the fuel mixture in order to maintain the flame at a desired temperature. Typically, one or more of the components of the exhaust stream that are monitored comprise one or more of $CO_2$, CO and oxygen. However, other components can be monitored so as to generate an exhaust stream containing less pollutants in a system operating at a greater fuel efficiency. It is also possible to reduce the amount of oxygen containing gas introduced into the combustion chamber to increase the fuel/gas ratio while maintaining the flame at or about the desired temperature and the $CO_2$ concentration at a level less than measured in a comparable control burn.

In a second embodiment, the combustion chamber is first seasoned by feeding just the catalyst. The process described above is then conducted without adding additional catalyst or adding sufficient catalyst to the fuel mix or the combustion chamber to maintain the maximum flame temperature and reduced $CO_2$ production.

In an embodiment for burning coal, a method has been developed to treat the coal with lithium and/or other alkali compositions to produce the $CO_2$ reductions, overcoming a major concern about oxidation characteristics. Lithium nitrate is a preferred composition for introducing alkali metals. Some compounds like lithium nitrate absorb moisture readily from the atmosphere. This property can be used to great advantage in overcoming the oxidizing effects of its dry powder form. A highly concentrated mixture of lithium nitrate and isopropyl alcohol was added to a batch of rice sized anthracite coal. The alcohol was evaporated leaving behind a coating of lithium nitrate on the surface of the coal which then absorbed moisture, making it indistinguishable from untreated coal. Treating the coal can also be accomplished by simply sprinkling some lithium nitrate on the coal and letting its natural properties complete the coating process. Alternatively, it can be applied by sprinkling or spraying a pre-formulated water solution on the coal. Various different carriers can be envisioned based on the hygroscopic nature of lithium nitrate which will be absorbed by and will adhere to the surface of the coal, and become combined with the "fixed" moisture in the coal. This is a simple means to overcome the oxidizer characteristics of the dry form of the material.

Internal combustion engine testing was conducted on an engine dynamometer test stand, with calibration traceable to NTIS standards. The engine used was a Pontiac LR-8 with an open loop engine control system. Raw engine exhaust was measured. The data in Table 10 is an average of tests run at three loads, namely low (1,000 rpm), medium (2,000 rpm) and high (3,000 rpm).

TABLE 10

Engine Dynamometer Testing

| | Carbon Monoxide | Hydrocarbons | Nitrogen Oxides | Oxygen |
|---|---|---|---|---|
| Baseline | 0.413 PPM | 1147 PPM | 1,628 PPM | 0.613% |
| With Reaction | 0.10 PPM | 857 PPM | 3,442 PPM | 2.495% |
| Percent Change | −76% | −25% | +111% | 307% |

Figure 22:
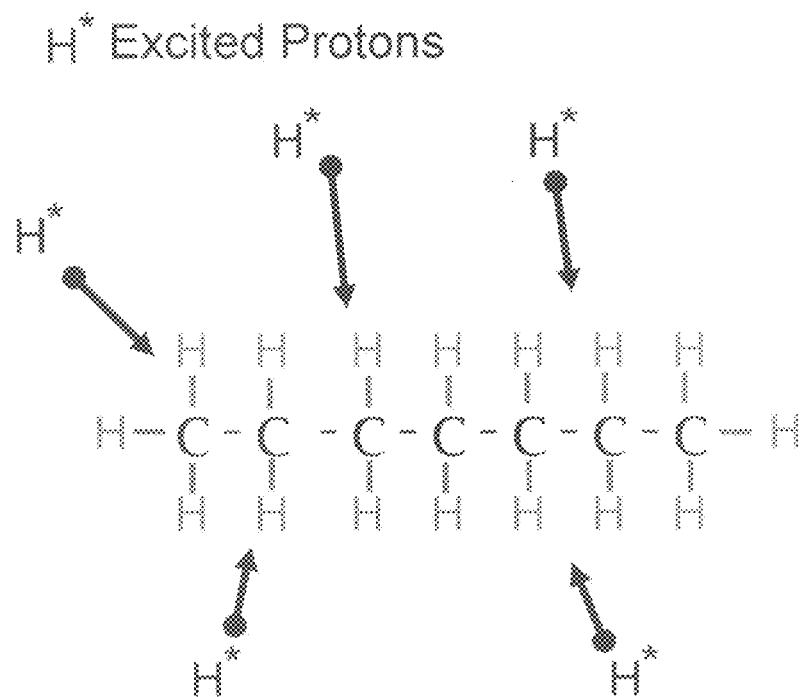
FIGS. 22 and 23 are schematic representations of a hydrocarbon compound being bombarded by activated or excited protons as a result of the presence of the catalyst in the processes, the kinetic energy of those protons shearing the hydrocarbon chains into smaller pieces.
Figure 23:
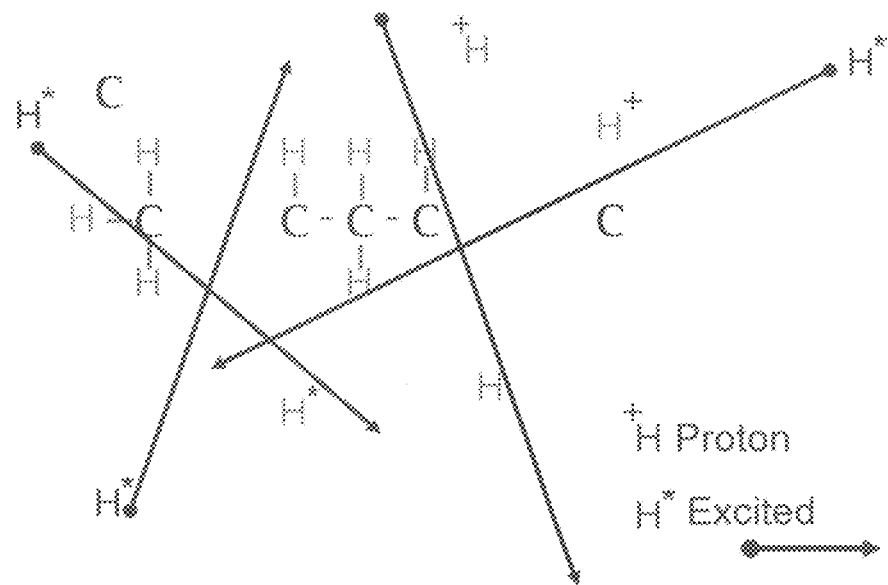

Although carbon monoxide pollution dropped by 76% and hydrocarbons dropped 25%; an unexpected discovery was the increase in oxygen in the exhaust by 307% and nitrogen oxides by 111%. The increase in nitrogen oxides is accounted for by the very high energy (temperature) of particle activity in the combustion zone. Nitrogen oxide formation is a function of time and temperature. The engine settings affecting time and temperature, load and spark timing, were held constant. The high energy and temperature of the reaction accounts for the higher NOx. It was also observed that higher oxygen levels should normally tend to reduce NOx by producing lower flame temperatures. This oxygen is formed by the reaction and has shown up in many tests when no adjustments were made to the mechanical aspects of the air/fuel ratio control. This additional oxygen available in the combustion zone facilitates cleaner and more efficient combustion as dry gas losses are lowered by less heat being carried away in the exhaust gases by the 80% nitrogen accompanying the air which is normally the source of oxygen for combustion. In the past laboratory testing of the combustion process has detected and identified high levels of particle activity. With the catalysts described herein and particularly lithium under controlled conditions. The presence of large quantities of high energy particles and Swift Protons" with the kinetic energy suitable for shearing long hydrocarbon chains, such as schematically shown in FIGS. 22 and 23 were observed.

Highly excited protons and other active particles activated by the catalysts have the capability to shear long and complex hydrocarbon chains, as well as combustion pollutants such as $CO_2$, CO, NO, $NO_2$, $SO_2$, $SO_3$, reducing them to smaller, more benign, cleaner burning molecules. This effect is also suitable for clean up of toxic and radioactive contamination, including mountains of commented coal ash and billions of tons of $CO2$ produced every year.

The highly energetic particles produced by catalyst advance beyond the flame front and shatter complex fuel molecules creating an extremely fast moving ionizing zone and an even-burning flame front activity. Experimental methods of control, relying on various types of instrumentation and observations have proven effective.

It follows from the forgoing description that processes and methods incorporating features of the present invention include a method wherein the internal surfaces of a combustion chamber exposed to combustion processes of hydrocarbon fuel powered systems are conditioned by lithium nitrate to enhance the efficiency of the combustion process, said methods comprising providing lithium nitrate dissolved in a hydrocarbon fuel to said hydrocarbon fuel powered system and combusting said hydrocarbon fuels.

The fuels contemplated for use in the present invention are set forth in, but are not limited to, the following standards which include hydrocarbon fuels such as gasoline, diesel fuel, biodiesel fuels, and fuels blended or containing alcohols as described in the following ASTM specifications. The fuels contemplated for use in the present invention are typically liquid hydrocarbon fuels in the gasoline boiling range. Gasoline fuels are supplied in grades and designations defined by the American Society of Testing and Management, ASTM D396-09a Specification for Fuel Oils, while ASTM D4814 Standard Specification for Automotive Spark-Ignition Engine Fuel defines fuel hydrocarbon compositions and blends with oxygenates. Motor gasoline typically have boiling ranges within 70-450° F. while aviation gasoline typically have boiling ranges within 100-300° F. Specifications used to define fuel-alcohol blends include ASTM D5798 for Fuel Ethanol and ASTM D4797 for Fuel Methanol. The ASTM D975-10a Specification for Diesel Fuel Oils defines petroleum distillate grades, biodiesel, fuel oils, and sulfur content is incorporated by reference. The requirements specified for diesel fuel oils are determined in accordance with the following test methods: flash point; cloud point; water and sediment; carbon residue; ash; distillation; viscosity; sulfur; copper corrosion; cetane number; cetane index; aromaticity; lubricity; and conductivity The ASTM D7467-08 Specification for Diesel Fuel Oil, Biodiesel Blend is a newer specification defining blends of fuel for on-and-off road vehicles.

In the examples below, combustion products of hydrocarbon fuel (defined as mol % concentrations) in an engine before the effluent emissions are altered by the hydrocarbon fuel engine emissions systems are measured by collecting vehicle emission gas samples in a stainless steel pipe before the catalytic converter. Vehicles were run 4 hours per fuel tank with an estimated gas collection temperature 300-400° C.

The exact method used and specified by the Gas Processors Association Publication, "Analysis for Natural Gas & Similar Gaseous Mixtures by Gas Chromatography" #2261 is incorporated by reference. A Perkin Elmer Thermal Conductivity Detector (TCD) and Gas Chromatograph (GC) with a 15 M GC capillary column was used for separation of effluent gas components.

The following examples are directed to a lithium nitrate fuel additive (the catalyst) comprising a 0.1 M solution $LiNO_3$ in isopropanol. The 0.1M solution is prepared by adding 7.0 g of dry $LiNO_3$ to 1 L of isopropanol. One ml of solution was then added to 7 kilograms fuel to obtain 1 microgram $LiNO_3$ in fuel. The fuel density is approximately 6.1 to 6.3 lb/gal.

A total sample intake of 10-13 ppm $LiNO_3$, with a variation +/−1-2 gallons fuel per test, was used for each vehicle example studied and reported.

In the data presented below baseline samples refer to fuel only with no additive or catalyst. LiNO3 was added to fuel at 10-13 ppm/vehicle fuel tank.

EXAMPLE 13

As shown, the use of Li in a gasoline-powered engine in accordance with the method of this invention provides a combustion effluent gas having a reduced carbon dioxide concentration.

|  | Mol % Analysis | Second Measurement |
|---|---|---|
| #1 Dodge Truck Baseline | | |
| $C_6+$ | .071 | |
| $CO_2$ | 5.340 | |
| $N_2$ | 94.589 | |
| Btu Dry | 3.6 | |
| Btu Sat | 3.6 | |
| #1 Dodge Truck | | |
| $C_6+$ | .357 | .246 |
| $CO_2$ | .363 | 3.332 |
| $N_2$ | 99.280 | 96.422 |
| Btu Dry | 18.3 | 12.6 |
| Btu Sat | 18.0 | 12.4 |
| #2 Dodge Truck Baseline | | |
| $C_6+$ | .063 | |
| $CO_2$ | 5.423 | |
| $N_2$ | 94.514 | |
| Btu Dry | 3.2 | |
| Btu Sat | 3.2 | |
| #2 Dodge Truck | | |
| $C_6+$ | .286 | .227 |
| $CO_2$ | 2.552 | 3.321 |
| N2 | 97.162 | 96.452 |
| Btu Dry | 14.7 | 11.6 |
| Btu Sat | 14.4 | 11.4 |

EXAMPLE 14

As shown, the use of Li in a diesel-powered engine in accordance with the method of this invention provides a combustion effluent gas having a reduced carbon dioxide concentration and a reduced hexane concentration.

|  | Mol % Analysis | Second Measurement |
|---|---|---|
| Diesel Tractor Baseline | | |
| $C_6+$ | .017 | |
| $CO_2$ | .308 | |
| $N_2$ | 99.675 | |
| Btu Dry | .9 | |
| Btu Sat | .9 | |
| Diesel Tractor #1 | | |
| $C_6+$ | .007 | .000 |
| $CO_2$ | .110 | 1.242 (leak) |
| N2 | 99.883 | 99.758 |
| Btu Dry | .4 | .0 |
| Btu Sat | .4 | .0 |
| Diesel Tractor #2 | | |
| $C_6+$ | .000 | |
| $CO_2$ | .075 | |
| N2 | 99.925 | |
| Btu Dry | .0 | |
| Btu Sat | .0 | |

The increase in the $C_6+$ hexanes measurements indicate incomplete combustion of larger alkanes and other compounds which the TCD detector verifies as a Btu measurement of that combustion product.

Data collected by this method indicates mole % analyses for Dodge trucks using hydrocarbon based fuel to be approximately 5% $CO_2$ without the presence of $LiNO_3$ and reduced to approximately 3% or less $CO_2$ with the presence of $LiNO_3$, and 07% $C_6+$ hexanes without the presence of $LiNO_3$ and roughly increased by factors of 3-5 with the presence of $LiNO_3$.

As shown, the use of Li in a gasoline-powered engine in accordance with the method of this invention provides a combustion effluent gas having a reduced carbon dioxide concentration.

The results from Example 13 indicate the presence of $LiNO_3$ alters the combustion of the gasoline hydrocarbon fuel in an engine. These results indicate an internal surface conditioned by combusting a hydrocarbon fuel containing a lithium salt provides a lithium conditioned surface, wherein the effluent gas has a lower concentration of carbon oxides than combusting said fuel under similar conditions in an engine not having a lithium conditioned surface. Thereafter, the lithium conditioned internal surface in contact with combusting hydrocarbon fuel provides an effluent gas with an effluent gas having a lower concentration of carbon oxides than combusting said hydrocarbon fuel under similar conditions in an engine not having a lithium conditioned surface.

Data collected by this method indicates mole % analyses for diesel trucks using diesel hydrocarbon based fuel to be approximately 0.3% $CO_2$ without the presence of $LiNO_3$ reduced to approximately 0.1% or less $CO_2$ with the presence of $LiNO_3$, and approximately 0.017% $C_6+$ hexanes without the presence of $LiNO_3$ and decreased with the presence of $LiNO_3$.

The results from Example #14 indicate the presence of $LiNO_3$ alters the combustion of the diesel hydrocarbon fuel in a diesel engine. These results indicate an internal surface conditioned by combusting a hydrocarbon fuel containing a lithium salt provides a lithium conditioned surface, wherein the effluent gas has a lower mol % concentration of carbon oxides and lower mol % concentration of $C_6+$ alkanes than combusting said diesel hydrocarbon fuel under similar conditions in an engine not having a lithium conditioned surface. Thereafter, the lithium conditioned internal surface in contact with combusting diesel fuel provides an effluent gas wherein the effluent gas has a lower mol % concentration of carbon oxides and a lower mol % concentration of $C_6+$ alkanes than combusting said diesel fuel under similar conditions in an engine not having a lithium conditioned surface.

Afterburner

A thermal oxidizer, also known as a thermal incinerator, is a device that can be used for air pollution control for combustion processes and in chemical plants for the decomposition of hazardous gases that require maximum destruction, or to treat exhaust gases generated in a process where combustion or emissions control is incomplete. These devices are also referred to as afterburners or reheaters.

Many industries utilize these devices as fixed installations, which need to be supplemented at times of malfunction or overhaul of existing units. In many cases the unique features of the technologies set forth above, and claimed in applicant's prior patents to which priority is claimed, can also be combined with movable equipment or vehicles to meet new compliance requirements of regulatory bodies at a lesser expense, faster and with greater utility than by any other means. The key to this advantage is its ability to produce desired effects in much less process time, at lower costs, and with restricted physical limitations as demonstrated by applicant in testing programs showing a high level of portability and efficiency of mobile unit design.

These devices can be adapted to receive upstream chemical process contaminants, methane from landfills or sewage treatment plants, or coal mine ventilation air containing methane, CO, VOCs and $CO_2$ as well as exhaust streams from combustion sources having non-optimum emissions control of off gases, such as CO, $CO_2$, NOx or SOx, and Hg, or any other gaseous contaminant or nuisance such as offensive odors from coat combustion or refinery processing. Reduced emissions and increased efficiencies also result when afterburners such as described herein are integrated with emissions streams from engines, gas turbines, boilers and furnaces.

The improvements described herein below are primarily directed, but are not limited, to methods for processing waste streams and emissions from combustion systems such as engines, turbines, boilers, and furnaces of fixed design, particularly systems built and designed to operate using specific fuels, having specific operating characteristics and intended to meet regulatory compliance requirements. Such systems often subjected to changing operating requirements as a result of new laws and regulations, such as lower emissions standards, or are converted to accommodate different fuels, such as biomass, natural gas or synthetic fuels, in an attempt to lower $CO_2$ and other emissions and to deal with challenges like mercury reduction. There are many real-world uncertainties that plant management must deal with not only comply with regulatory changes but also for competitive economic reasons involving huge costs often associated with new rules and operating requirements. The afterburner unit described herein provides a flexible and cost-effective answer to the wide range of operating challenges by providing a portable reaction device readily adaptable to being added to existing facilities to receive emissions from a broad range of sources and to provide a cleaner exit emission stream.

Also, among the problems faced by industry is that power plants are fixed systems by design and require monitoring and controlling vast quantities of potentially dangerous fuels that can cause disastrous explosions and fires as well as dangerous high-pressure steam. Safe control of such systems requires highly qualified operators and complex controls because these systems are complex, dynamic and dangerous if not operated properly. The addition of afterburners as described herein avoids the complexity and danger of modifying front end control system by providing the opportunity to separately treat the exhaust gasses to meet changing emission standards.

Afterburners have been added to coal fired furnaces as well as other chambers used to burn wood, coal or petroleum products and other organic matter. In such instances the afterburner is typically used because the initial burn in the primary combustion chamber is inefficient and results in a significant level of numerous different pollutants, often referred to as "products of incomplete combustion" or PICs, in the exhaust stream.

While there are numerous examples of after burners in the art, an example of such an afterburner is disclosed in U.S. Pat. No. 9,803,857 to Tiegs and the several prior patents cited therein, incorporated herein by reference. The '857 patent is directed to an exhaust gas emissions reduction system comprising a reaction chamber (an afterburner) downstream of a primary combustion chamber, that reaction chamber also including an injector for adding an oxidizing agent. The reaction chamber can be followed by a catalyst bed in fluid communication with the exhaust from the reaction chamber. The '857 patent also discusses prior art thereto, for example U.S. Pat. Nos. 3,468,634, 4,385,032, 4,476,852, 5,460,511, and 5,944,025 which include a catalyst bed (a catalytic converter) downstream from the primary combustion chamber for reducing CO and volatile hydrocarbons but, according to Tiegs they are not adequately effective unless an oxidizer is added. Further, particulate emissions are not adequately treated and they will deposit on and foul the catalyst beds. On the other hand, the '857 patent discloses that heating exhaust streams to greater than 1500° F. (816° C.) without the addition of oxidizing agent largely obviates any need for a catalyst bed as these temperatures are effective for rapidly and completely decomposing organic molecules in the exhaust streams and prevent buildup and fouling of surfaces. Contrary to the teachings of Tiegs, the afterburner systems described herein reduce or remove these fouling factors and carbon buildup and provides heavier slag deposits so that they are easier to remove during maintenance and clean up cycles.

The catalyst bed in the '857 patent comprises platinum oxide, palladium oxide, or a combination of the two, located downstream from the reaction chamber, the PICs being reduced by adding the oxidizer into the catalyst-free reaction chamber. According to Tiegs, an effective means to achieve near-100% oxidation of PICs and organic particulates without heating exhaust streams to over 800° F. (427° C.) is to inject a strong oxidizing agent into the exhaust stream prior to heating in the reaction chamber channels. Temperatures significantly greater than 1500° F. (816° C.) can produce excessive NOx emissions, so lower temperatures may be desirable. Many compounds are known which can be used to oxidize organic compounds, but most have other undesirable characteristics. Chloride- and fluoride-based oxidizers can produce undesirable waste products, can be dangerous to handle and can result in expensive repair and replacement of exposed metal surfaces making use of such oxidizers undesirable. Oxidizers which are not completely consumed in reactions with organics may themselves become unwanted pollutants. Cost of the chemicals and familiarity of the public with safety requirements are also concerns. Tiegs has found that heat labile oxidizing agents are preferred because any excess oxidizing agent will be destroyed by the high temperatures achieved inside the reaction chamber. Thus, many oxidizing agents will function with such a system, but certain agents are preferable. In particular, Tiegs finds the oxidizing agents ozone ($O_3$) and hydrogen peroxide ($H_2O_2$) added to the reaction chamber maintained at 600° F. (327° C.) to be especially effective for eliminating PICs from an exhaust steam that is maintained at greater than 800° F. (427° C.) before entering the reaction chamber.

Whether afterburners (reaction chambers) utilizing oxidizing agents, or catalytic converters or elevated temperatures alone are used to destroy PICs, the intended purpose of those procedures is to substantially convert carbonaceous materials in the exhaust stream leaving the combustion chamber, generating large quantities of $CO_2$, which is now considered to be an environment pollutant and allegedly a cause of global warming.

The process described above and set forth in the above referenced parent patents is directed to reduction of both CO and $CO_2$ in an exhaust stream 100 exiting a combustion chamber buy adding a catalyst, preferably comprising elemental lithium and/or boron, or compounds containing lithium and/or boron, preferably including a small quantity of a fuel as is necessary to assist in the combustion of the PICs in the exhaust 110 fed to the afterburner 102. It has now been found that the quantities of both CO and $CO_2$ as well as other regulated pollutants in the exhaust stream 100, 110 can be further reduced, without affecting the power output and efficiency obtained from burning the fuel in the combustion chamber by passing the exhaust stream 100, or a portion 110 thereof, through an afterburner 102 and only feeding, from a fuel/catalyst mixing tank 104, a small amount of catalyst into the exhaust stream 110 in the afterburner 102, the exhaust 120 from the afterburner 102 having further reduced PICs, CO and $CO_2$ content.

Figure 24:
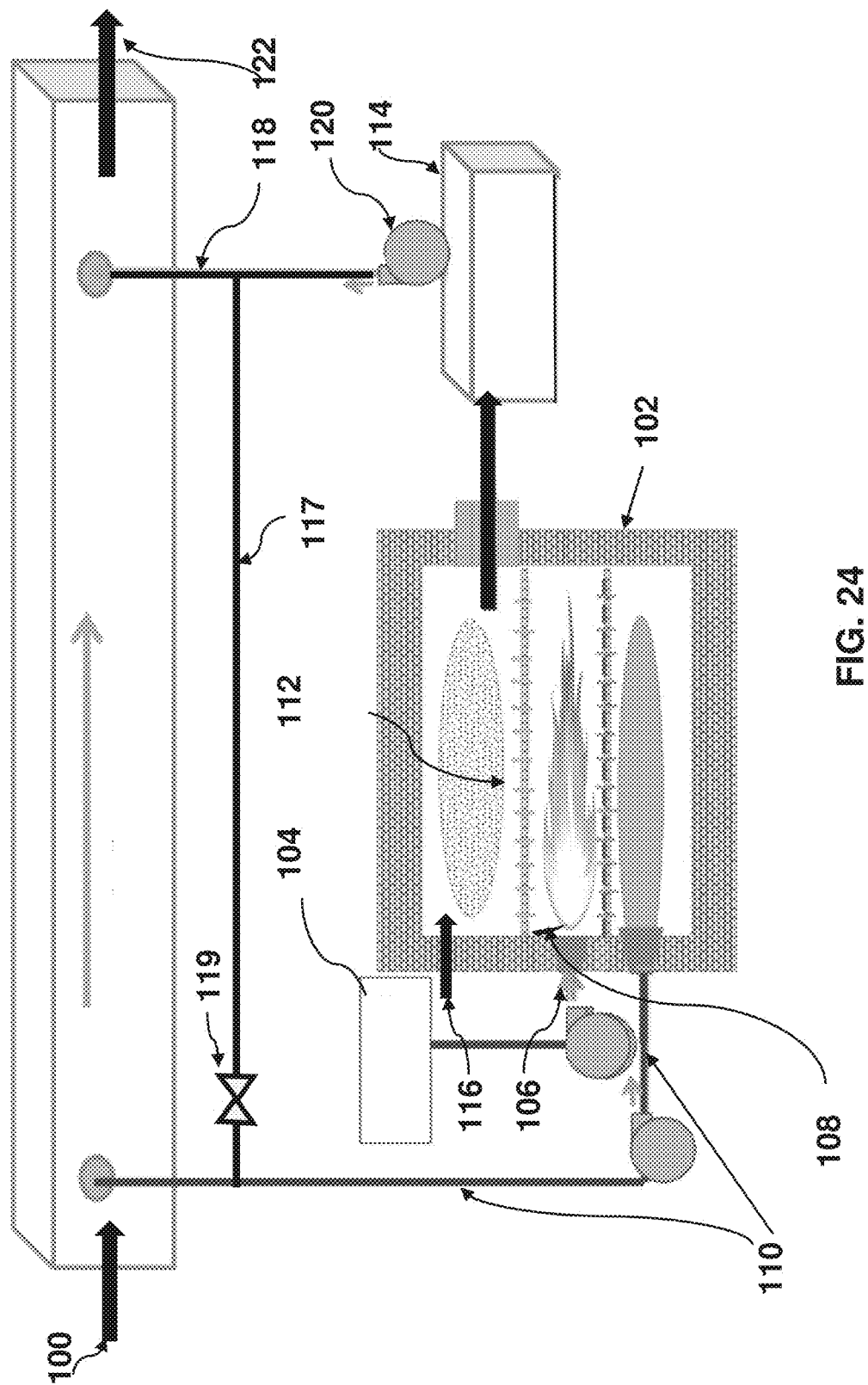
FIG. 24 is a schematic representation of an afterburner system incorporating features of the invention described herein.

The addition of the afterburner 102 described herein and shown in FIG. 24 consistently provides a significantly improved burn efficiency and improvements in the quality and content of emissions beyond prior design performance levels in regard to $CO_2$ and other emissions.

As a further alternative, the hydrocarbon fuel feed entering the combustion chamber can be burned in the most efficient manner known to those skilled in the art without adding the catalyst to the combustion chamber. The exhaust 100 from that combustion, or a portion thereof 110, is then fed to the afterburner 102 along with a controlled quantity of fuel/catalyst mixture. Alternatively, the afterburner 102 can be pre-seasoned by a prior lithium and/or boron feed thus reducing the quantity of catalyst that is added with the controlled quantity of fuel. Treating the fuel feeding the combustion chamber is then avoided because only the exhaust gases 100, 110 are exposed in the after-burner 102 to the presence of the lithium and/or boron catalyst to reduce the CO, $CO_2$ and other undesirable emissions A catalyst mixing and delivery system 104 is provided to deliver the catalyst/fuel mixture to the afterburner 102 for treating exhaust gases 110 passing therethrough. A small burner 108 ignites the fuel, such as distillate oil, mixed with concentrated catalyst, the amount of each provided at a concentration and delivery volume for the exhaust stream 110 flow and exhaust contents being treated. An oxygen containing stream (i.e., air) 116 can also be added to the afterburner 102 or the exhaust 110 entering the afterburner. The exhaust gas 110 is then exposed to the catalyst and reacted in a mixing chamber 112 in the afterburner 102, or an adjacent supplementary mixing and reaction chamber 114, reducing the CO and $CO_2$. An exhaust blower 120 or similar device can be attached to the afterburner 102 to then inject the treated exhaust 118 exiting the afterburner 102 back into the original exhaust stream 100 or it can be recirculated via ducting 117 to the input exhaust stream 110, the recirculated flow being controlled by a damper 119, to continue to reduce emissions levels and $CO_2$ to provide a cleaner exhaust 122.

The quantity of exhaust gas treated by the afterburner 102 is regulated based on the affluent temperature, volume, and concentration of gas species in the exhaust 100, 110 to be controlled. As the composition of fuels being burned may be variable, especially where the fuel is coal, operational adjustments of the afterburner 102 are monitored and determined by analysis of coal composition and the resulting $CO_2$ and other emissions in the exhaust steam 100, 110 reaching the afterburner 102. The target properties of the cleaner exhaust 122 which are determined by specific environmental requirements encountered such as temperature, humidity and trace elements in the fuel with the operating parameters of the processes described herein applied to produce required or optimum emission quality.

One skilled in the art will recognize, based on the teachings herein, that all of the exhaust 100 can be passed through the afterburner 102 or the exhaust 100 can be divided into several side streams 110 which are then treated in multiple afterburners 102.

Although there has been described hereinabove a catalyst conditioned engine, specifically a lithium catalyst conditioned engine, for reduced carbon dioxide emissions in accordance with the present invention and an afterburner using a lithium and/or boron catalyst for reducing CO and $CO_2$ in an exhaust stream for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

I claim:

1. In an improved process for reducing the ratio of $CO_2$/BTU of energy produced from the combustion of a carbon-based or hydrocarbon fuel in a combustion chamber with an oxygen containing gas while maintaining or increasing the efficiency of said combustion and reducing the amount of pollutants produced in an exhaust stream exiting the combustion chamber, wherein:
   a. following establishment of baseline operating conditions for burning said fuel in an oxygen containing gas at an initial fuel/gas ratio to establish stable combustion with a base line flame temperature and measuring the base line temperature, exhaust stream composition and the energy output of the burning fuel during said stable combustion, therein establishing a set of base line operating parameters,
   b. adding an initial quantity of a catalyst comprising lithium and/or boron or a lithium and/or boron compound to said combustion chamber while feeding the carbon-based or hydrocarbon fuel and the oxygen containing gas at the initial fuel/gas ratio, to form a catalyst/fuel mixture and to incorporate lithium and/or boron or a lithium and/or boron compound into the walls of the combustion chamber to form a catalytic seasoned combustion chamber, said catalyst/fuel mixture producing a different stable flame temperature and an exhaust stream having a reduced $CO_2$ and CO composition when compared to the composition of the base line operating conditions exhaust stream, and
   c. once the components of the exhaust stream obtained during the combustion after the new stable flame temperature for the catalyst/fuel mixture is reached reducing the quantity of the catalyst delivered while maintaining the flame at a third temperature greater than the base line flame temperature,
   the improvement comprising further reducing the $CO_2$ and CO in the combustion chamber exhaust buy providing an after-burner, said afterburner receiving the exhaust stream, the after-burner also configured to receive and burn a fuel/lithium and/or boron catalyst mixture in said exhaust stream.

2. An improved process for reducing the ratio of $CO_2$/BTU of energy produced from the combustion of a carbon-based or hydrocarbon fuel in a combustion chamber while maintaining or increasing the efficiency of said combustion and reducing the amount of pollutants in an exhaust stream exiting the combustion chamber wherein:

stable operating conditions for burning said fuel in an oxygen containing gas is established at a preset fuel/gas ratio to generate a base line flame temperature, base line composition of the exhaust stream and the energy output of the burning fuel during said stable combustion, said base line flame temperature and base line exhaust stream composition constituting a baseline operating condition, and monitoring the baseline operating condition, including the $CO_2$ and CO concentrations in the exhaust stream, the improvement comprising reducing the exhaust stream $CO_2$ and CO concentration by feeding the exhaust to an after-burner, said afterburner configured to receive and burn a fuel/lithium and/or boron catalyst mixture in the exhaust steam delivered thereto, wherein an optimum feed rate and composition of the fuel/lithium and/or boron catalyst mixture to reduce the $CO_2$ and CO concentration in said exhaust stream is selected based on the base line operating conditions.

3. The process of claim 2 wherein an oxygen containing gas stream is also fed to the afterburner.

\* \* \* \* \*